(12) United States Patent
Brogren et al.

(10) Patent No.: US 8,472,714 B2
(45) Date of Patent: Jun. 25, 2013

(54) IDENTIFICATION APPARATUS AND METHOD FOR IDENTIFYING PROPERTIES OF AN OBJECT DETECTED BY A VIDEO SURVEILLANCE CAMERA

(75) Inventors: Martin Brogren, Lund (SE); Markus Skans, Lund (SE); Johan Almbladh, Lund (SE); Daniel Elvin, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/310,375

(22) Filed: Dec. 2, 2011

(65) Prior Publication Data
US 2012/0133773 A1  May 31, 2012

Related U.S. Application Data

(62) Division of application No. 11/805,465, filed on May 22, 2007.

(60) Provisional application No. 60/802,721, filed on May 22, 2006.

(51) Int. Cl.
*G06K 9/00* (2006.01)

(52) U.S. Cl.
USPC ........... 382/168; 382/169; 382/162; 382/100; 382/232

(58) Field of Classification Search
USPC .. 348/100, 232, 162, 167, 168, 169; 345/596, 345/690–697; 358/3.01, 31.3
See application file for complete search history.

(56) References Cited

U.S. PATENT DOCUMENTS

| | | | |
|---|---|---|---|
| 6,226,388 B1 | 5/2001 | Qian et al. | |
| 6,389,168 B2 * | 5/2002 | Altunbasak et al. | 382/224 |
| 6,611,622 B1 | 8/2003 | Krumm | |

(Continued)

FOREIGN PATENT DOCUMENTS

| | | |
|---|---|---|
| EP | 1 347 393 | 9/2004 |
| EP | 1 452 995 | 9/2004 |

(Continued)

OTHER PUBLICATIONS

"Analys I Flera Variabler," A. Persson, Lars-Christer Boiers; Studentlitteratur, Lund Sweden 2001, Chapter 4.3; pp. 148-161.

(Continued)

*Primary Examiner* — Ali Bayat
(74) *Attorney, Agent, or Firm* — Volpe and Koenig, P.C.

(57) ABSTRACT

The present invention deals with an identification apparatus (100) in a video surveillance system for identifying properties of an object captured in a video sequence by a video surveillance camera. The identification apparatus comprises: an object identification unit (102) for identifying a specific object in a video sequence; a color histogram generator (104) for generating a color histogram in at least two dimensions of a color space based on color and intensity information of the specific object identified in the video sequence, the color and intensity information originating from a plurality of images of the video sequence; and an object properties identificator (106) for identifying properties of the object based on the generated color histogram. The identified properties can then be used in a tracking device (200) of the video surveillance system for tracking an object between different video sequences, which may be captured by two different video surveillance cameras. The present invention also deals with a corresponding method for identifying properties of an object captured in a video sequence and a method for tracking the object in a video surveillance system.

6 Claims, 13 Drawing Sheets

U.S. PATENT DOCUMENTS

| | | | |
|---|---|---|---|
| 6,523,301 B2 | 3/2004 | Krumm et al. | |
| 6,829,391 B2 | 12/2004 | Comaniciu et al. | |
| 6,952,496 B2 | 10/2005 | Krumm | |
| 7,450,735 B1* | 11/2008 | Shah et al. | 382/103 |
| 7,742,073 B1* | 6/2010 | Cohen-Solal et al. | 348/169 |
| 7,817,822 B2 | 10/2010 | Sun et al. | |
| 2002/0141615 A1 | 10/2002 | McVeigh et al. | |
| 2003/0040815 A1 | 2/2003 | Pavlidis | |
| 2003/0128298 A1 | 7/2003 | Moon et al. | |
| 2004/0095374 A1 | 5/2004 | Jojic et al. | |
| 2005/0265582 A1 | 12/2005 | Buehler | |
| 2006/0028552 A1 | 2/2006 | Aggarwal et al. | |
| 2006/0165277 A1 | 7/2006 | Shan et al. | |
| 2007/0076935 A1* | 4/2007 | Jeung et al. | 382/128 |

FOREIGN PATENT DOCUMENTS

| | | |
|---|---|---|
| JP | 7030795 A | 1/1995 |
| JP | 11150676 A | 6/1999 |
| JP | 2005346287 A | 12/2005 |

OTHER PUBLICATIONS

"Automatic Detection and Indexing of Video-Event Shots for Surveillance Applications," G.L. Foresti, L. Marcenaro, C. S. Regazzoni; IEEE Transactions on Multimedia, vol. 4, No. 4, Dec. 2002.

"Color Constant Color Imaging," B.V. Funt, G.D. Finlayson; IEEE Transactions on Pattern Analysis and Machine Intelligence, vol. 17, No. 5, May 1995; pp. 522-529.

"Color-Based Object Recognition," T. Gevers, A. W.M. Smeulders; Pattern Recognition 32, pp. 453-464; Pattern Recognition Society 1999, published by Elseview Science, Ltd.

"Image Modeling and Estimation, A Statistical Approach," Ch. 2.2.4 'Data Reduction,' Finn Lindgren, Lund University Center for Mathematical Sciences Mathematical Statistics, Lund, Sweden, Oct. 12, 2006.

"Image Modeling and Estimation, A Statistical Approach," Ch. 2.3.3 'The EM-Algorithm for Mixture Distrubutions, ' Finn Lindgren, Lund University Center for Mathematical Sciences Mathematical Statistics, Lund Sweden, Oct. 12, 2006.

"Kernel-Based Object Tracking," D. Comaniciu, V. Ramesh, P. Meer; Siemens Corporate Research and Rutgers University; "Conference on Computer Vision and Pattern Recognition," IEEE, 2000 Hilton Head, South Carolina.

"Multi-Camera Calibration, Object Tracking and Query Generation," Mitsubishi Electric Research Laboratory (MERL) TR-2003-100, Aug. 2003; F. Porikli, A. Divakaran.

"Online Selection of Discriminative Tracking Features," R.T. Collins, Y. Liu, M. Leordeanu; IEEE Transactions on Pattern Analysis and Machine Intelligence, vol. 27, No. 10, Oct 2005).

"Parallel Color Space Converters for JPEG Image Compression," L.V. Agostini, I.S. Silva, S. Bampi; Microelectronics Reliability 44 (2004); pp. 697-703; Elsevier.

"Recognition of Human Activity in Metro Transit Spaces," G. Gasser, N. Bird, N. Papanikolopoulous; Intelligent Transport Systems Institute, Center of Transportation Studies, University of Minnesota, 2004.

"Some Methods for Classification and Analysis of Multivariate Observations," J. MacQueen University of California; $5^{th}$ Berkeley Symposium on Mathematical Statistics and probability, 1967, pp. 281-297.

"Video-Based Surveillance Systems, Computer Vision and Distributed Processing," Kluwer Academic Publishers 2002, Chapter 3, pp. 38-51; "Two Examples of Indoor and Outdoor Surveillance Systems: Motivation, Design, and Testing;" I. Pavlidis. V. Morellas.

"View Matching with Blob Features," PE. Forssen, A. Moe, Computer Vision Laboratory Department of Electrical Engineering; Linkoping University, Sweden, Canadian Conference on Computer and Robot Vision, IEEE 2005.

Annual Report, AXIS AB, 2005, Lund Sweden.

Johnson, I., et al. "Multi-object tracking in video" in Real-Time Imaging vol. 5, Issue 5, Oct. 1999, pp. 295-304.

Piccardi, M. et al. "Track matching over disjoint camera views based on an incremental major color spectrum histogram" Proceedings. IEEE Conference on Advanced Video and Signal Based Surveillance, 2005. Como, Italy, Sep. 15-16, 2005, Piscataway, NJ, USA, IEEE, pp. 147-152.

Zivkovic, Z. et al. "An EM-like algorithm for color-histogram-based object tracking" Proceedings of the 2004 IEEE Computer Society Conference on Computer Vision and Pattern Recognition 27 Jun. 27-Jul. 2, 2004, Washington, DC, USA vol. 1, Jun. 27, 2004, pp. 798-803, XP010708820.

Perez, P. et al. "Color Based Probabilistic Tracking", European Conference on Computer Vision, Berlin, DE May 27, 2002, pp. 661-675, XP002328867.

Kurata, T, et al. "The Hand-Mouse: A Human Interface Suitable for Augmented Reality Environments Enabled by Visual Wearables", Proceedings of the International Symposium on Mixed Reality Jan. 1, 2001, pp. 188/189, XP007900186.

Raja, Y. et al. "Tracking and segmenting people in varying lighting conditions using colour" Automatic Face and Gesture Recognition, 1998. Proceedings, Third IEEE International Conference on NARA, Japan, Apr. 14-16, 1998, Los Alamitos, CA, USA, IEEE Comput. Soc. US., Apr. 14, 1998, pp. 228-233, XP010277621.

Tao, Ji et al. "Color appearance-based approach to robust tracking and recognition of Multiple people", Information, Communications and Signal Processing, 2003 and Fourth PAC IFIC RIM Conference on Multimedia. Proceedings of the 2003 Joint Conference of the Fourth International Conference on Singapore, Dec. 15-18, 2003, Piscataway, NJ, USA, IEEE, vol. 1, Dec. 15, 2003, pp. 95-99, XP010702135.

Huang, Yan et al. "Tracking Multiple Objects through Occlusions" Computer Vision and Pattern Recognition, 2005 IEEE Computer Society Conference on, IEEE, Piscataway, NJ, USA vol. 2, 20 Jun. 2005, pp. 1051-1058, XP010817572.

Piccardi, M. et al. "Multi-Frame Moving Object Track Matching Based on an Incremental Major Color Spectrum Histogram Matching Algorithm" Computer Vision and Pattern Recognition, 2005 IEEE Computer Society Conference, IEEE, Piscataway, NJ vol. 3, Jun. 20, 2005, pp. 19-24, XP010870005.

Jinman Kang et al. "Continuous tracking within and across camera streams" Proceedings/2003 IEEE Computer Society Conference on Computer Vision and Pattern Recognition, 18-20 Jun. 2003 Madison, Wisconsin, Los Alamitos, Calif., vol. 1, 18 Jun. 2003, pp. 267-272, XP010644907.

Jinman Kang et al., "Persistent Objects Tracking Across Multiple Non-Overlapping Cameras" 2005 Seventh IEEE Workshops on Applications of Computer Vision (WACV/Motion '05) Jan. 5-7, 2005 Breckenridge, CO, USA, IEEE, Los Alamitos, Calif., USA Jan. 1, 2005, pp. 112-119, XP031059155.

R. Bowden et al. "Towards automated wide area visual surveillance: tracking objects between spatially-separated, uncalibrated views", IEE Proceedings-Vision, Image, and Signal Processing, vol. 152, No. 2, Jan. 1, 2005, pp. 213-223, XP055055745.

Ying Wu et al. "Nonstationary Color Tracking for Vision-Based Human-Computer Interaction" IEEE Transactions on Neural Networks, IEEE Service Center, Piscataway, NJ, US vol. 13, No. 4, Jul. 1, 2002, pp. 948-960, XP011077293.

* cited by examiner

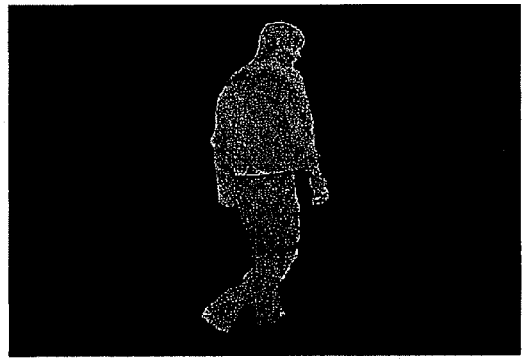
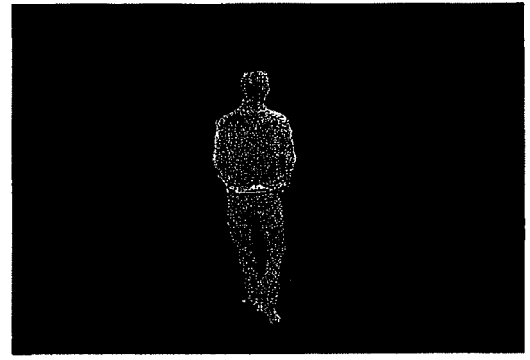
Fig. 16a            Fig. 16b
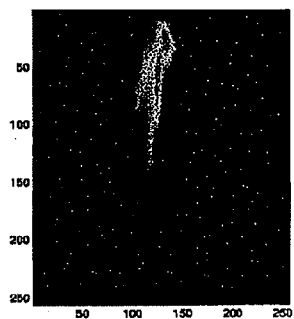
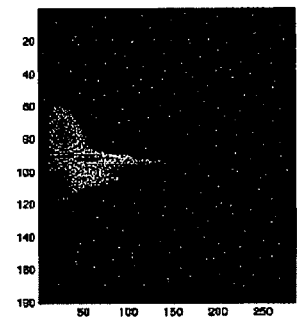
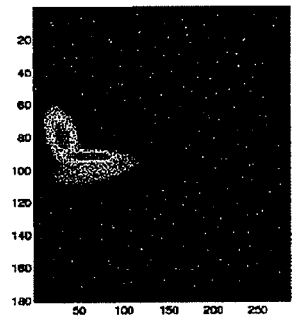
Fig. 17a
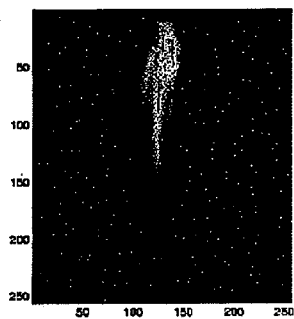
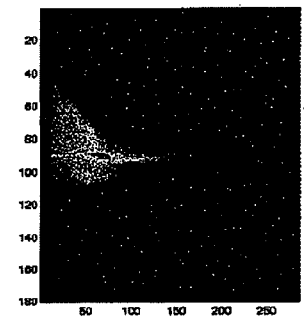
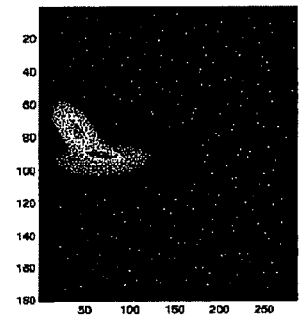
Fig. 17b

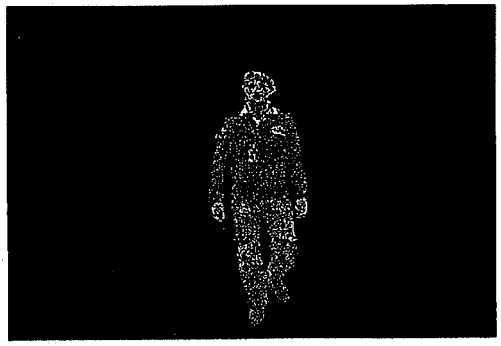
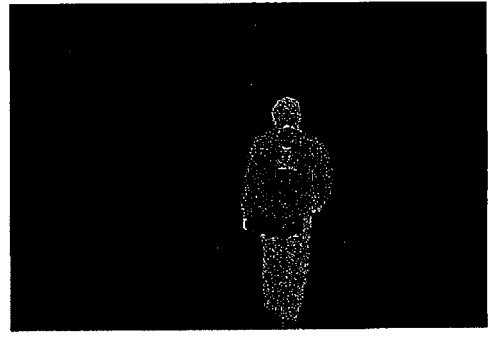
Fig. 18a       Fig. 18b
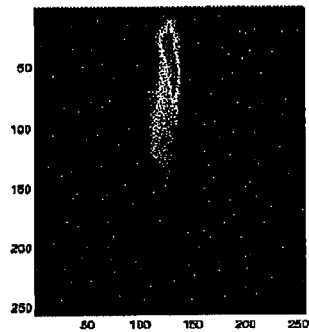
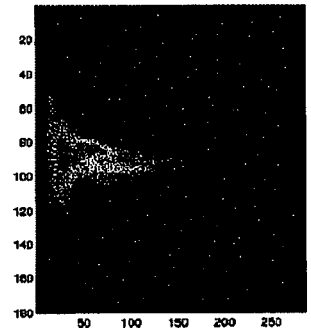
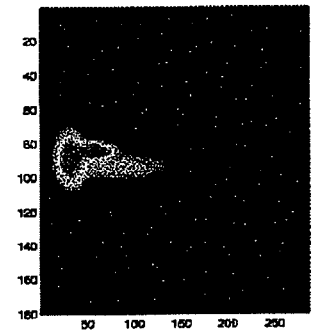
Fig. 19a
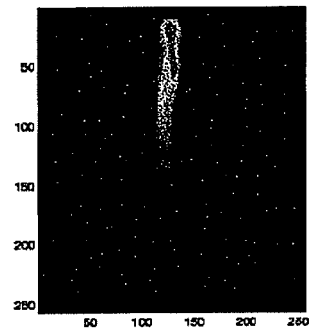
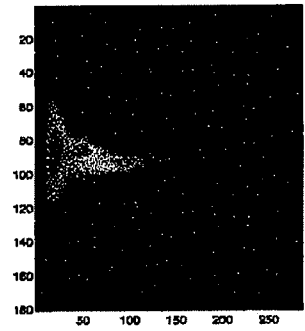
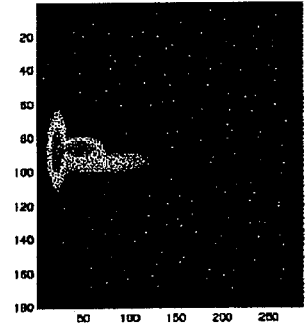
Fig. 19b

IDENTIFICATION APPARATUS AND METHOD FOR IDENTIFYING PROPERTIES OF AN OBJECT DETECTED BY A VIDEO SURVEILLANCE CAMERA

CROSS REFERENCE TO RELATED APPLICATIONS

This application is a division of U.S. patent application Ser. No. 11/805,465, filed May 22, 2007, which claims the benefit of U.S. Provisional Application No. 60/802,721 filed on May 22, 2006 which is incorporated herein by reference in its entirety as if fully set forth herein.

BACKGROUND OF THE INVENTION

1. Field of Invention

The present invention relates to an identification apparatus in a video surveillance system for identifying properties of an object detected in a video sequence captured by a video surveillance camera and to a method for identifying properties of an object detected by a video surveillance camera. The invention also relates to a video surveillance system for tracking an object in a video surveillance system and to a method for tracking an object in a video surveillance system.

2. Description of the Related Art

Closed Circuit TeleVision (CCTV) systems are used mainly for surveillance purposes. Recent years surveillance systems have increased at airports, public areas, schools, highways and many other places. The CCTV market consists of two segments, analogue systems and digital network video systems. Network video systems has several advantages when compared with the analogue systems. These are the most important reasons why the network video market share is growing: Remote accessibility; Easy, future proof integration; Scalability and flexibility.

One characteristic that differentiates digital network video systems from analogue systems is the former systems' suitability of image processing in real time. This is possible when integrating some sort of digital signal processor with the camera and implementing algorithms on it.

Real time surveillance is today very labour intensive, which leads to high costs. The level of human's attention is also rapidly degrading over time. It would therefore be desirable to use intelligent video functions for processing images as an assisting tool in these types of jobs. That would both reduce the labour costs and improve the performance. Useful intelligent video functions that would facilitate the surveillance in real time are: Motion detection, e.g. detect a trespassing person in an empty facility; Detect specific events, e.g. detect a car crash; Recognition, e.g. follow the path of a suspicious person in a big ambiguous camera system.

If network video cameras could perform these functions in a satisfying way, they would have a unique advantage over their analogue counterparts.

For being able to detect and track non rigid bodies, such as humans, in a video surveillance system comprising a plurality of cameras, i.e. between different video sequences or scenes captured by different cameras, following factors has to be taken into consideration: Humans are not rigid and therefore their shapes may change; Different viewpoints in the sequences; Different illumination level between scenes and within a scene; Different illumination color between scenes and within a scene; Different distance to the camera in the sequences.

Due to these circumstances, several methods for detecting and tracking non-rigid objects are not applicable. Low resolution and the distance between the camera and the object make all methods dealing with details useless. Texture in peoples clothing tend to be very fine, and therefore texture based methods also falls.

It is an object of the invention to be able to recognize non-rigid objects, such as humans. The method can therefore not be sensitive for changes in the shape of the object.

Since the customer of surveillance cameras does not want to calibrate their cameras, the method cannot not depend on that the position of the camera is known. Because of that the angle from which the object is viewed can not be taken into account. Methods based on relative sizes of different parts of the object are therefore useless, e.g. relative lengths of arms and legs.

The tracking problem has been widely explored, but known methods for tracking people are not applicable here due to some important differences between tracking a person within a scene and recognizing a person in different scenes, where different scenes may originate from different cameras. When tracking a person within a scene, the problem is to find the person in every new frame. The information from the previous frame is then very useful. The illumination, angle of view and position of the person are all likely to be the same or change only a little between frames. When changing scene all this information might be lost. Therefore the methods for recognizing humans between different scenes have to use other features than regular tracking methods.

A method for identifying and tracking objects between different scenes should be used as an assisting tool in surveillance systems with a large amount of cameras. Therefore it is acceptable that the method does some wrong matches rather than misses some right matches. The surveillance personal that are watching the monitors can in the former case easily manually recognize the right person. In the latter case the method would not be to any help for the personal.

Consequently, there is a need for a method and a system for identifying properties of an object, which properties can be used for tracking objects between different video sequences, which method would be reliable in such a way that it does not miss any object occurring in two different video sequences.

SUMMARY OF THE INVENTION

An object of the invention is to achieve methods in a video surveillance system, an apparatus in a video surveillance system and a video surveillance system which alleviates at least some of the above mentioned problems.

This is achieved according to a first aspect of the invention by an identification apparatus in a video surveillance system comprising: an object identification unit for identifying a specific object in a video sequence; a color histogram generator for generating a color histogram in at least two dimensions of a color space based on color and intensity information of the specific object identified in the video sequence, wherein the color and intensity information originates from a plurality of images of the video sequence; and an object properties identificator for identifying properties of the object based on the generated color histogram. By the color histogram generator being arranged to generate a color histogram of the object based on a plurality of images of a video sequence, different possible appearances of the object can be received and combined into a color histogram. This means that if the object has turned around and moved a lot in the video sequence, a color histogram can be achieved which fully describes the object from many possible views. Thereby, the histogram becomes invariant to spatial changes in the image. Also, since the color histogram is based on intensity and color only, the color histogram is independent of from which image the information originates, i.e. independent of time.

It is obvious to anyone skilled in the art that the same apparatus can be used for any at least two dimensional histogram utilizing any multidimensional representation derived from a color and intensity color space.

According to an embodiment of the invention, the object properties identificator further comprises a histogram modeler for modeling the color histogram with a number of distributions, such as normal distributions. By modelling the color histogram with a number of distributions, the amount of data received from the color histogram can be reduced to an amount which is more manageable for identifying properties of the object.

According to another embodiment of the invention, the object properties identificator further comprises a histogram transformer for transforming the color histogram from a Cartesian coordinate system into a polar coordinate system. Thereby, it is facilitated to separate properties of the object in the histogram from properties of the color histogram depending on the environment. In a color histogram each color part of an object is represented by a blob having a certain extension in the color histogram. By transforming the modeled color histogram into a polar coordinate system with $\rho$ and $\alpha$ coordinates, an intensity change in illumination between a first video sequence of an object and a second video sequence of the same object would roughly lead to a position change of the blobs in the $\rho$ direction, and a change in the colour of light between the sequences would roughly lead to a position change of the blobs in the $\alpha$ direction. This knowledge could be used when separating environmental influences in the images from properties of the object.

According to yet another embodiment of the invention, the object properties calculator is arranged for calculating the properties of the object by weighting the parameters of the number of distributions depending on each parameter's significance in recognition of the object. By giving the parameters of the distributions different weighting factors depending on how much each parameter is estimated to correlate with the properties of the object, a calculated value for the properties of the object can be received.

According to still another embodiment, the histogram transformer is further arranged for transforming the color histogram from the polar coordinate system to a second Cartesian coordinate system, and arranging the origin of the second Cartesian coordinate system at the centre of mass of the object in the color histogram. Thereby, an internal coordinate system for describing the object in a color histogram is achieved, which facilitates to separate information in the color histogram into parameters that are more or less correlated with the properties of the object.

According to another embodiment of the first aspect of the invention, the identification apparatus further comprises a normalization unit for normalizing the color and intensity information originating from each of the plurality of images with respect to the number of pixels the object is described by in each image. Thereby, the color and intensity information becomes pixel neutral, e.g. invariant to different time each image was taken and to the scale of the object.

According to another embodiment, the color space is a color space in which intensity information and color information can be separated, such as YCbCr, HSV or YUV color space. By using a color space from which intensity and color information can be separated, properties in the color histogram relating to the object can be separated from properties in the color histogram relating to the environment in which the video sequence is captured.

According to yet another embodiment, the color histogram is generated based on color and intensity information in substantially all images of the video sequence. The more images that are used for generating the color histogram, the less dependent the histogram from temporal and spatial aspects of the object.

According to still another embodiment, the object properties identificator is arranged for identifying, based on the generated color histogram, parameters describing the object in the video sequence, and the object properties identificator comprises an object properties calculator for calculating, based on the identified parameters, properties of the object. The object properties identificator may further be arranged for identifying a center of mass of the color histogram and a color histogram distribution and for calculating parameters for identifying properties of the object based on the identified centre of mass and the identified color histogram distribution. The features center of mass and color histogram distribution has proven to be good features to start with for calculating parameters which can be used for identifying properties of the object.

According to a second aspect of the invention, a video surveillance system is provided. The video surveillance system comprises: a number of video surveillance cameras connected to a common communication network; at least one identification apparatus according to the first aspect of the invention, the at least one identification apparatus being connected to the common communication network; and a tracking device for tracking an object in a video surveillance system, the tracking device being connected to the common communication network. The tracking device comprises: a receiver for receiving information from the at least one identification apparatus, the information comprising information regarding identified properties of a candidate object identified in a first video sequence captured by a first video surveillance camera and information regarding identified properties of an object to track identified in a second video sequence captured by a second video surveillance camera; a matching unit for matching the identified properties of the candidate object with the identified properties of the object to track; and a calculation unit for calculating, based on the matching step, the likelihood of the candidate object being identical to the object to track.

Such a video surveillance system can automatically detect whether a candidate object in a second video sequence is the same object as an object to track in an earlier captured first video sequence. By the at least one identification apparatus being arranged to generate color histograms of an object from a plurality of images of a video sequence, the system will become invariant to spatial changes and to temporal changes of the object in each video sequence, whereby the possibility of the system missing a correct match will be low.

According to a third aspect of the invention, a method in a video surveillance system for identifying properties of an object in a video sequence captured by a video surveillance camera is provided. The method comprises the steps of: identifying a specific object in the video sequence; generating a color histogram in at least two dimensions of a color space, based on color and intensity information of the specific object identified in the video sequence, the color and intensity information originating from a plurality of images of the video sequence; and identifying properties of the object based on the generated color histogram.

By generating the color histogram based on a plurality of images of a video sequence, different possible appearances of the object is received and combined into a color histogram. This means that if the object has turned around and moved a lot in the video sequence, a color histogram can be achieved which fully describes the object from many possible views. Thereby, the histogram becomes invariant to spatial changes in the image. For example, if the object is a person and the person holds a jacket or wears it does not matter in the color histogram. The properties of the object identified based on this color histogram can later be used e.g. for detecting the object in a later video sequence from the same camera or from another camera regardless of position and viewing angle of the object in the new video sequence. Also, since the color histogram is based on intensity and color, the color histogram is independent of from which image the information originates, i.e. independent of time.

According to an embodiment of the third aspect of the invention, the method further comprises the steps of modeling the color histogram with a number of distributions, such as normal distributions, and identifying properties of the object based on the generated and modeled color histogram.

According to another embodiment, the method further comprises the step of transforming the color histogram from a Cartesian coordinate system into a polar coordinate system. In the embodiment when the method comprises both embodiments above, the step of transforming is preferably performed after the step of modelling the color histograms with distributions, to decrease the amount of calculation work in the transforming step, although, the transforming step might also be performed before the step of modelling.

According to a fourth aspect of the invention, a method for tracking an object in a video surveillance system is provided. The method comprises the steps of: identifying an object to track in a first video sequence captured by a first video surveillance camera; identifying properties of the object to track in accordance with the method of the third aspect of the invention; identifying a candidate object in a second video sequence captured by a second video surveillance camera; identifying properties of the candidate object in accordance with the method of the third aspect of the invention; matching the identified properties of the candidate object with the identified properties of the object to track; calculating, based on the matching step, the likelihood of the candidate object being identical to the object to track. By this method it can be automatically detected whether a candidate object in a second video sequence is the same object as an object to track in an earlier captured first video sequence. Since the method of the third aspect of the invention is invariant to spatial changes and to temporal changes of the object in each video sequence, the possibility of the method of the fourth aspect missing a correct match will be low.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

Figure 11A:
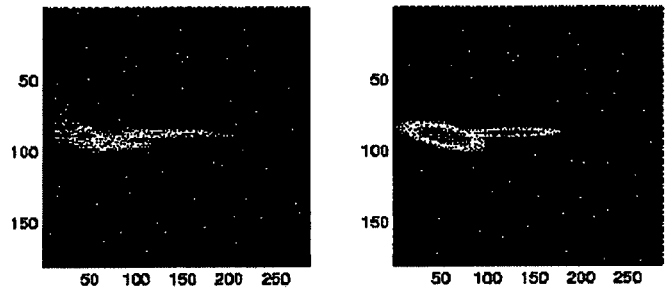
Figure 11B:
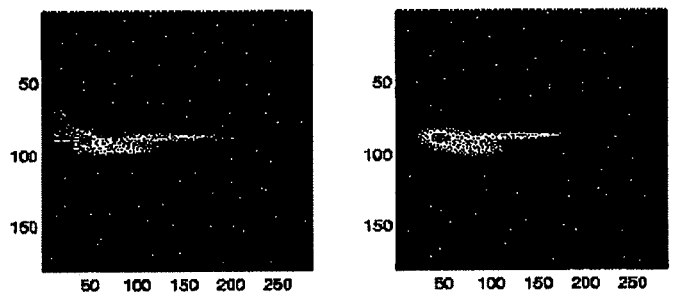
Figure 11C:
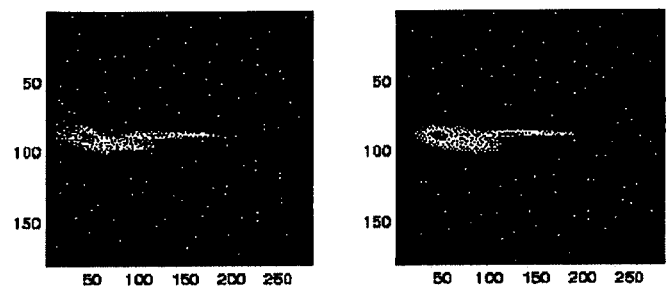

In each of FIGS. 11a-c a histogram of a person in a scene is shown in the left image and the histogram modeled with a varying number of normal distributions is shown in the right image in $\alpha\rho$ coordinates.

Figure 12:
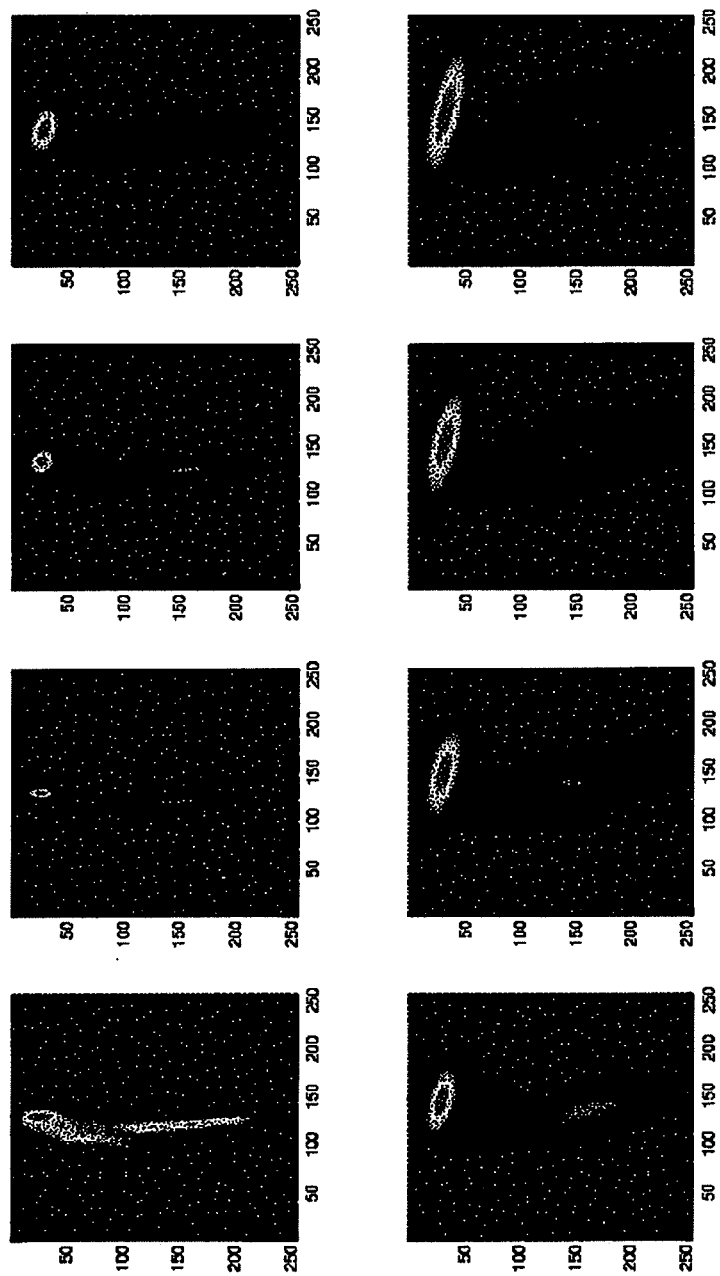

FIG. 12 comprises eight images, wherein the first image shows a histogram of a person in a scene and the other images show corresponding normal distributions of the histogram with different relative frequencies ($\pi_0$) of a rectangle distribution.

Figure 13:
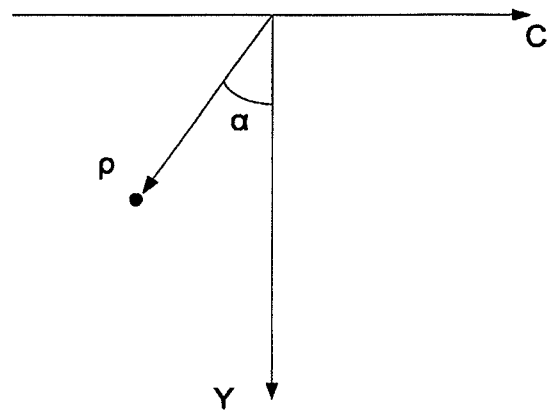

FIG. 13 shows in a YC coordinate system, a coordinate system having coordinates $\rho$ and $\alpha$.

Figure 14:
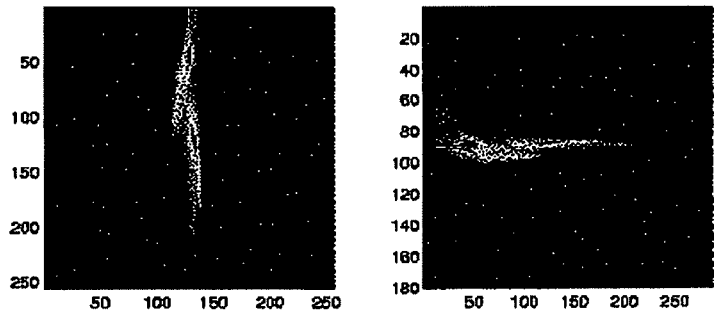

FIG. 14 shows a histogram in YCb to the left in the figure and the same histogram in the coordinate system having $\alpha$ and $\rho$ as coordinate axes to the right in the figure.

Figure 15:
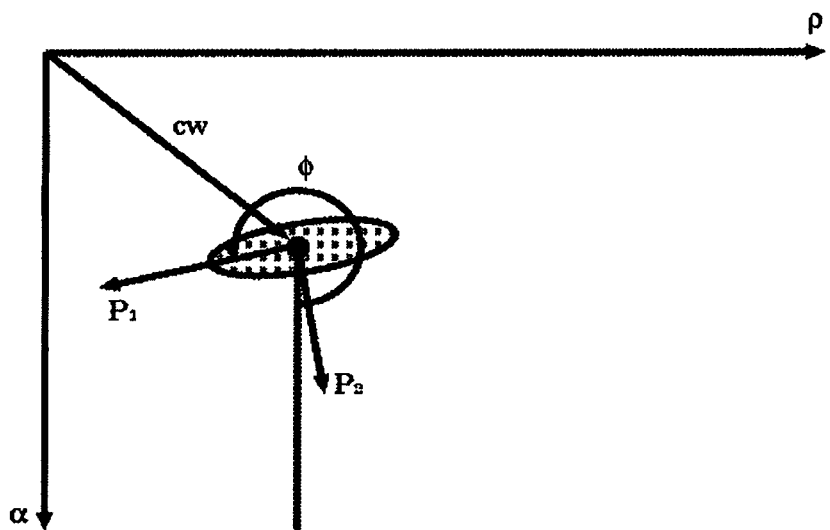

FIG. 15 shows an internal cluster coordinate system.

FIGS. 16a-b each shows a segmented image from a video sequence, each image being from a separate video sequence.

FIGS. 17a-b each shows one histogram in the YCb colorspace (left), the histogram modeled with normal distributions (middle), and the distribution models transformed to the $\rho$-$\alpha$ coordinate system (right) of each of the video sequences illustrated with an image in the corresponding figure of FIGS. 16a-b.

FIGS. 18a-b each shows a segmented image from other video sequences, each image being from a separate video sequence.

FIGS. 19a-b each shows one histogram in the YCb colorspace (left), the histogram modeled with normal distributions (middle), and the distribution models transformed to the $\rho$-$\alpha$ coordinate system (right) of each of the video sequences illustrated with an image in the corresponding figure of FIGS. 18a-b.

DETAILED DESCRIPTION OF THE EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1A:
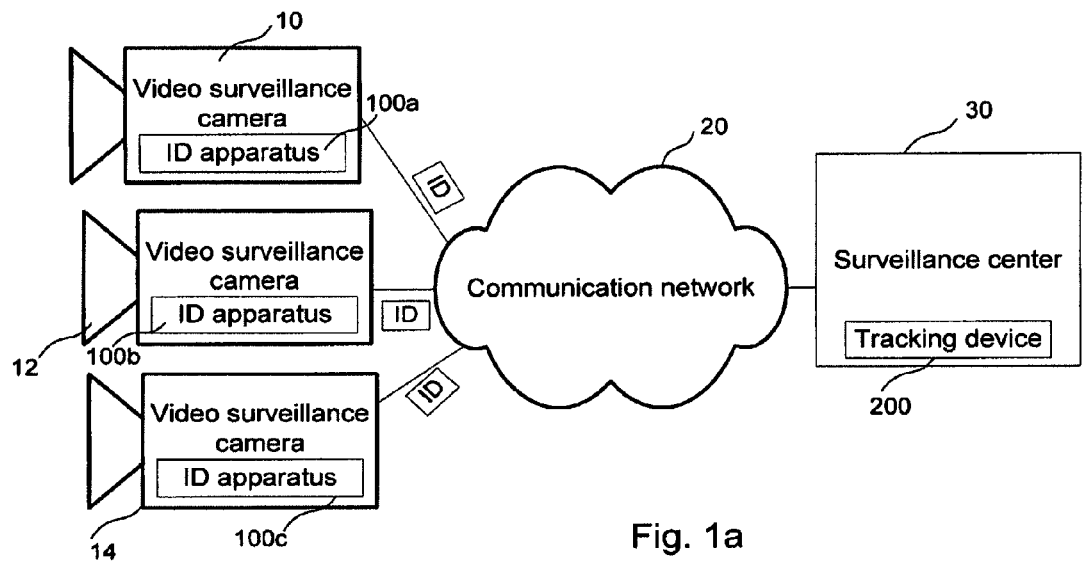
FIG. 1a schematically illustrates a video surveillance system according to an embodiment of the invention.
Figure 1B:
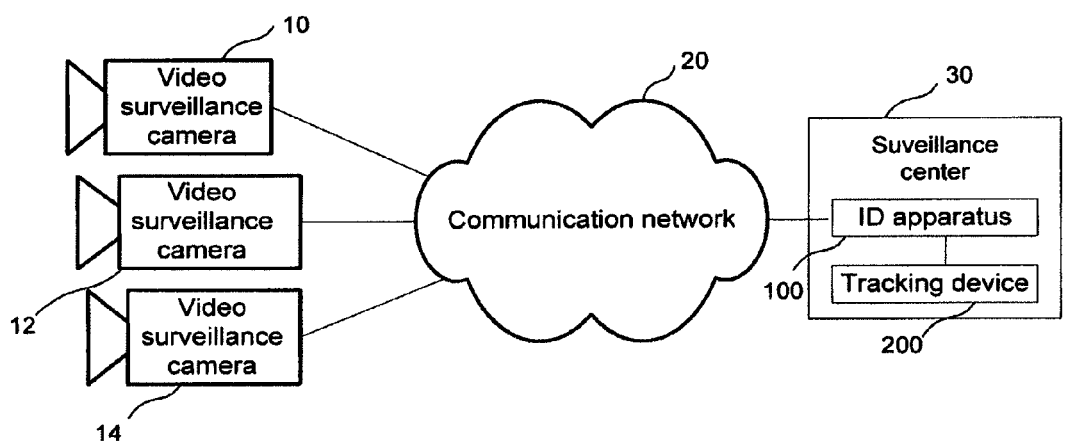
FIG. 1b schematically illustrates a video surveillance system according to another embodiment of the invention.

FIGS. 1a and 1b illustrate video surveillance systems according to the present invention. The video surveillance systems comprise a number of video surveillance cameras 10, 12, 14 connected to a surveillance center 30 via a communication network 20. The video surveillance cameras 10, 12, 14 may be any digital cameras capable of generating image sequences and/or any analog cameras capable of generating image sequences, in which case the analog camera is connected to a converter transforming the analog image information to digital image data and providing the digital image data to the network 20. The communication network 20 may be any kind of communication network for communicating digital image information, such as a wireline or wireless data communication network, e.g. a local area network (LAN) or a wireless local area network (W-LAN) or a Wide Area Network (WAN).

In the system described in FIG. 1a the video surveillance cameras 10, 12, 14 each comprises an identification apparatus 100a, 100b, 100c, according to the invention (see FIG. 2), for identifying properties of an object in a video sequence captured by the video surveillance camera. After identifying properties of an object, each video surveillance camera is arranged to communicate the identified properties, ID, to a node in the network, such as the surveillance center 30. For this reason, the surveillance center 30 is provided with a tracking device 200, according to the invention (see FIG. 3), for tracking an object in the video surveillance system based on identified properties of the object to track received from a first video camera 10 and on identified properties of a candidate object received from a second camera 12. The tracking device is arranged such that the identified properties of the object to track is compared to the identified properties of the candidate object to calculate whether the candidate object is identical to the object to track.

In the system described in FIG. 1b there are no identification apparatus in the video surveillance cameras 10, 12, 14. Instead, the surveillance center 30 comprises at least one identification apparatus 100, in addition to its tracking device 200. In this system, the video surveillance cameras 10, 12, 14 are arranged to send video sequences to the surveillance center for identifying properties of objects in the identification apparatus arranged in the surveillance center.

According to another embodiment, some of the cameras are provided with an identification apparatus 100 and some of the cameras are not provided with an identification apparatus. Then input data is communicated from the cameras without an identification apparatus to the cameras having an identification apparatus. An alternative in this case would be to also have an identification apparatus 100 in a central node, such as the surveillance center 30, in which case input data may be communicated from the cameras without an identification apparatus to the identification apparatus in the central node.

According to yet another embodiment, at least one of the cameras in the video surveillance system may be provided with a tracking device 200.

Also, the tracking device 200 may receive information regarding identified properties of a candidate object from the same camera as it has received identified properties of an object to track. In that case the identified properties of the object to track originates from a first video sequence and the identified properties of the candidate object originates from a second video sequence separate from the first video sequence.

Figure 2:
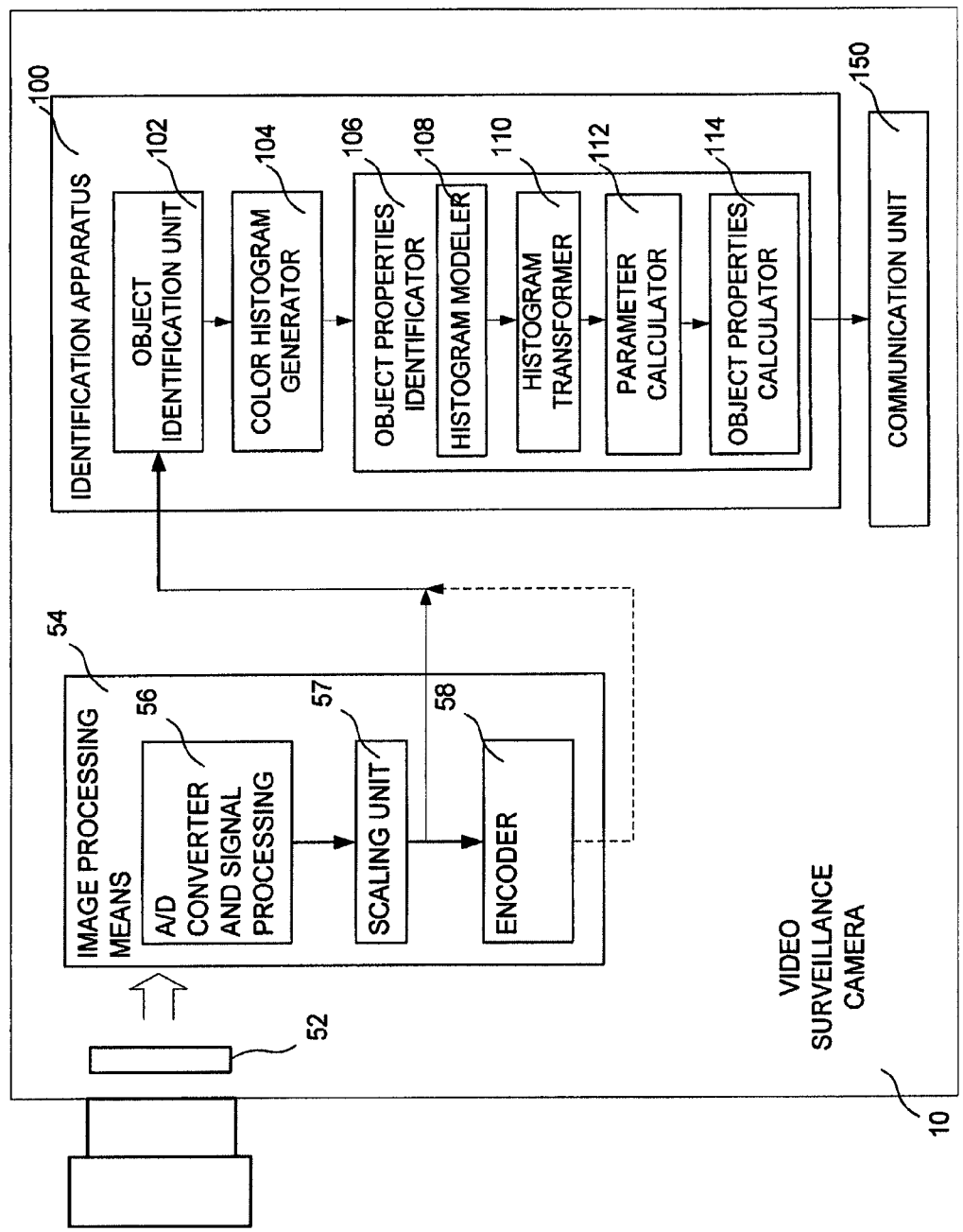
FIG. 2 illustrates a block diagram of a video surveillance camera comprising an identification apparatus according to the present invention.

In FIG. 2, a video surveillance camera 10 comprising an identification apparatus 100 according to an embodiment of the invention is schematically described. In order to facilitate the understanding of the invention, standard features of a video surveillance camera not being relevant for the present invention are not described. The video surveillance camera 10 includes an image sensor 52, e.g. a Charge Coupled Device (CCD), a CMOS-sensor or similar, for registering incident light, an image processing means 54, a communication unit 150 for communicating information via the communication network to other nodes connected to the network, and an identification apparatus 100 according to an embodiment of the invention.

The image processing means 54 receives information regarding the registered light and processes this information by means of an A/D-converter and signal processing means 56, which is well known by the skilled person. In some embodiments, e.g. when the image sensor 52 is a CMOS-sensor, the image sensor 52 includes A/D-converters and therefore there is no need for any A/D-converters in the image processing means 54. The result from the A/D-converter and signal processing means 56 is digital image data which, according to one embodiment, is processed in a scaling unit 57 and an encoder 58 before the digital image data is sent to the identification apparatus 100. The scaling unit 57 is arranged to process the digital image data into at least one image of a particular size. However, it may be arranged to generate a plurality of images of different sizes, all representing the same image/frame provided by the A/D converter and the signal processing means 56. According to another embodiment, the function of the scaling unit is performed by the encoder and in yet another embodiment there is no need to perform any scaling or resizing of the image from the image sensor.

The encoder 58, which is optional for executing the invention, is arranged to encode the digital image data into any one of a plurality of known formats for continuous video sequences, for limited video sequences, for still images or for streamed images/video. For instance, the image information may be encoded into MPEG1, MPEG2, MPEG4, JPEG, MJPG, Bitmapped, etc. The identification apparatus 100 may use non-coded images as input data. In that case, image data is taken from the signal processing means 56 or from the scaling unit 57 to the identification apparatus 100, without passing the image data through the encoder 58. The non-coded images may be in any non-coded image format, such as BMP, PNG, PPM, PGM, PNM, PBM. Although, the identification apparatus 100 may also use encoded data as input data.

In an embodiment of the invention, the image data may be sent directly from the signal processing means 56 to the identification apparatus 100, without passing the scaling unit 57 or the encoder 58. In yet another embodiment, the image data may be sent to the identification apparatus 100 from the scaling unit 57 without passing the encoder.

The identification apparatus 100 of FIG. 2 comprises an object identification unit 102, a color histogram generator 104, and an object properties identificator 106. The object identification unit 102 is arranged to identify an object in a video sequence based on the image information received from the image processing means 54. The object can be identified in the object identification unit 102 either manually or automatically according to any known object identification technique. The color histogram generator 104 is arranged for generating a color histogram based on color and intensity information of the identified object, which information originates from a plurality of images of the video sequence. By a color histogram is meant a histogram describing colors. The object properties identificator 106 is arranged for identifying properties of the object based on the generated color histogram. By using information originating from a plurality of images of a video sequence when generating the color histogram, the identification apparatus becomes insensitive to temporal and spatial aspects, i.e. when and where in the picture the object was identified, compared to if information from only one image was used. The more images that are used, the more robust is the identification apparatus to temporal and spatial aspects. This means that the identification apparatus of the invention can identify properties of an object with a high certainty, since the apparatus has a low sensitivity to changes in the appearance of the object in different video sequences.

According to an embodiment of the invention, the properties of an object can be identified in different steps. E.g. first the properties may be identified based on color and intensity information in a small number of images of a video sequence, e.g. 5 images. Thereafter, a refined identification of the properties of the object may be accomplished based on a larger amount of images of the video sequence, for example in a later stage when the object has been seen in more number of images in the video sequence.

According to an embodiment of the invention, the object properties identificator 116 comprises: a histogram modeler 108, a histogram transformer 110, a parameter calculator 112 and an object properties calculator 114.

The histogram modeler 108 is arranged for modeling the generated color histogram with a number of distributions, in one embodiment normal distributions, such that the amount of data is decreased. The histogram transformer 110 is arranged for transforming the color histogram from a Cartesian coordinate system into a polar coordinate system with $\rho$ representing intensity and $\alpha$ representing color. Thereby, it is facilitated to separate properties of the object in the color histogram from properties of the color histogram depending on the environment. The parameter calculator 112 is arranged for calculating parameters of the number of distributions, which parameters are indicative for identifying properties of the object. The object properties calculator 114 is arranged for calculating properties of the object based on the calculated parameters, by weighting the parameters depending on each parameter's significance for identifying properties of the object. Each parameters significance may e.g. be tested in advance in a testing step. The communication unit 150 of the camera 10 is arranged for example to communicate information regarding the properties of the object identified from the color histogram by the identification apparatus 100 in the camera 10 to a tracking device arranged in another node in the communication network, or alternatively arranged in the same camera.

According to an embodiment of the invention, the identification apparatus may also comprise a normalization unit for normalizing the color and intensity information originating from each of the plurality of images with respect to the number of pixels the object is described by in each image.

Figure 3:
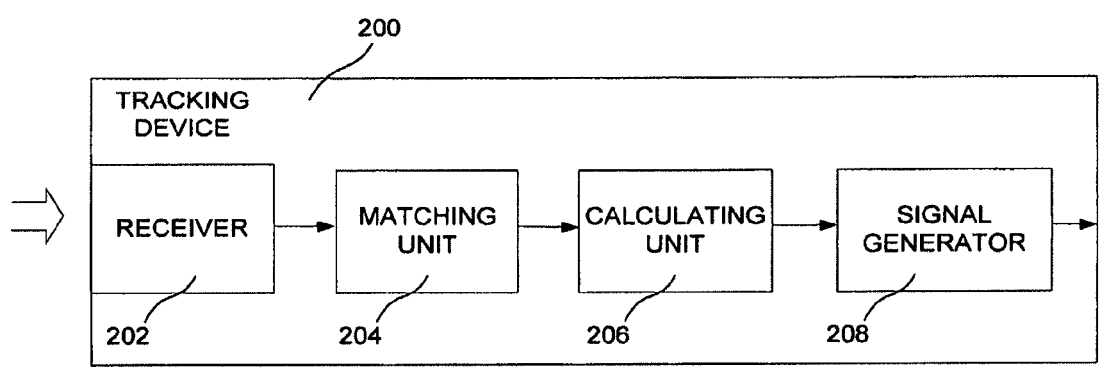
FIG. 3 shows a block diagram of a tracking device according to the present invention.

FIG. 3 illustrates a tracking device 200 according to the invention. The tracking device 200 comprises a receiver 202, a matching unit 204, a calculating unit 206 and a signal generator 208. The receiver 202 is arranged for receiving information from a first identification apparatus, information regarding the identified properties of the object to track and for receiving information from a second identification apparatus, information regarding the identified properties of a candidate object. Alternatively, the first and the second identification apparatus may be the same identification apparatus.

The matching unit 204 is arranged for matching the information regarding identified properties of the candidate object with the information regarding identified properties of the object to track. The calculation unit 206 is arranged for calculating, based on the matching step, the likelihood of the candidate object being identical to the object to track. The result of the calculation can then be sent as a signal to a presentation unit, such as a display in a surveillance center for being presented on the display to indicate to a person working at the surveillance center that a match/non-match has been found. The result of the calculation can be a probability value indicating the probability of the candidate object being identical to the object to track. The signal generator 208 is arranged to generate such a signal based on the result of the calculation.

Figure 4:
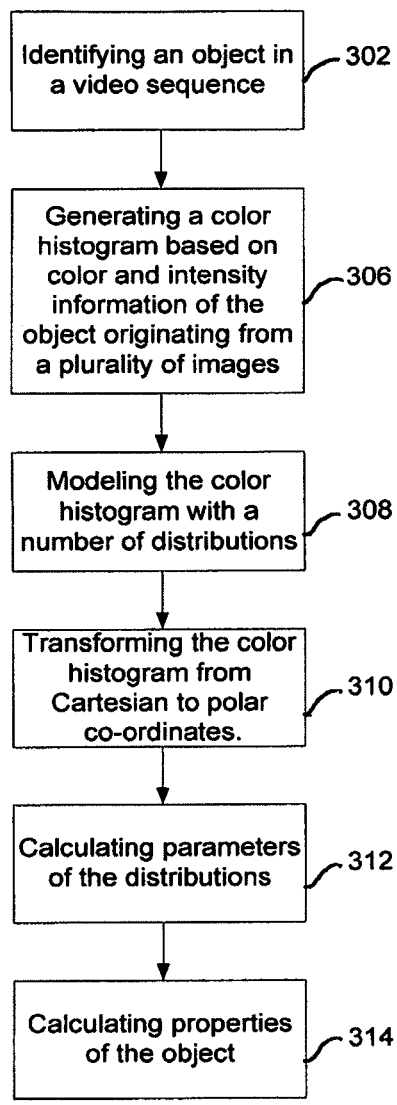
FIG. 4 shows a flow chart of a method for identifying properties of an object according to the invention.

FIG. 4 illustrates a method for identifying properties of an object in a video sequence captured by a video surveillance camera, according to an embodiment of the invention. The method comprises the following steps: Identifying 302 an object in a video sequence captured by a video surveillance camera; Generating 306 a color histogram based on color and intensity information of the object from a plurality of images in the video sequence; Identifying properties of the object based on the generated color histogram.

According to embodiments of the invention, the step of identifying properties of the object based on the generated color histogram further comprises one or more of the following steps: Modeling 308 the color histogram with a number of normal distributions; Transforming 310 the modelled distributions from a Cartesian co-ordinate system into a polar co-ordinate system; Calculating 312 parameters of the distributions, which parameters are used for identifying properties of the object, and calculating 314 properties of the object based on the calculated parameters of the object, by weighting the parameters of the distributions depending on each parameter's correlation with the properties of the object. The steps of modeling 308 and transforming 310 may take place in any mutual order.

According to an embodiment of the invention, the method further comprises the step of normalizing color and intensity information of the object in each image by the number of pixels the object is described in each image. The step of normalizing may take place either before or after the step of generating 306 the color histogram.

In an embodiment of the invention, the step of calculating 312 parameters of the distributions comprises: Transforming the color histogram from the polar coordinate system to a second Cartesian coordinate system; Moving the origin of the coordinates to the centre of mass of the object in the color histogram; Calculating the position of the number of distributions in the second Cartesian coordinate system, wherein the position of the number of distributions in the second Cartesian coordinate system is used as a parameter for identifying properties of the object.

The step of calculating 312 parameters of the distributions may further comprise: Identifying a center of mass of the color histogram and a color histogram distribution; and calculating parameters for identifying properties of the object based on the identified centre of mass and the identified color histogram distribution. In this case the term "color histogram distribution" should be interpreted as an extension in the color histogram of a cluster of blobs that describes the object. The histogram can be described as comprising a number of blobs, wherein each blob is defined as a one-color object portion and wherein the object is described as a cluster of such one-color object portions.

Figure 5:
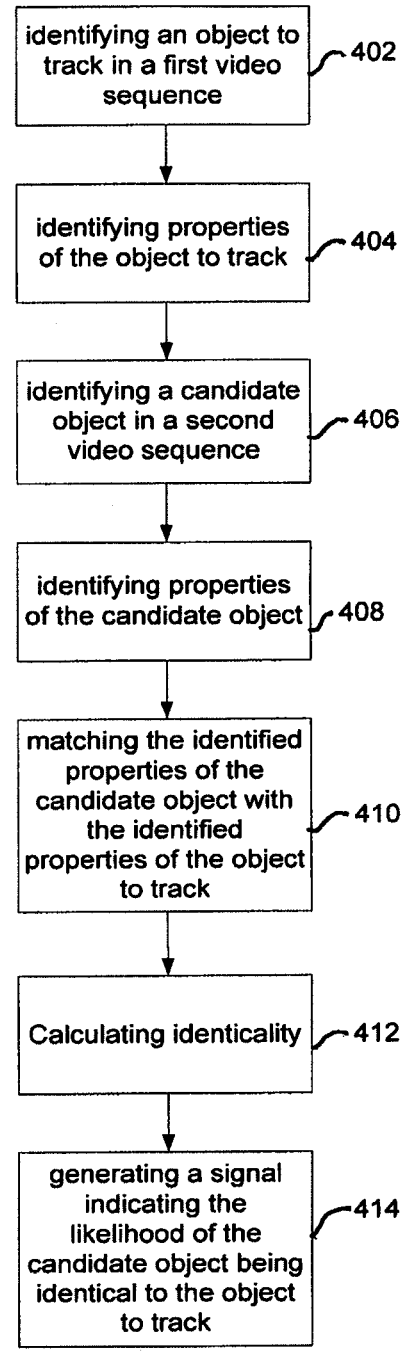
FIG. 5 shows a flow chart of a method according to the invention for tracking an object in a video surveillance system.

FIG. 5 illustrates a method for tracking an object in a video surveillance system, according to an embodiment of the invention. The method comprises: Identifying 402 an object to track in a first video sequence captured by a first video surveillance camera; Identifying 404 properties of the object to track in accordance with the method shown in FIG. 4; Identifying 406 a candidate object in a second video sequence captured by a second video surveillance camera; Identifying 408 properties of the candidate object in accordance with the method shown in FIG. 4; Matching 410 the identified properties of the candidate object with the identified properties of the object to track; Calculating 412, based on the matching step, the likelihood of the candidate object being identical to the object to track; and Generating 414 a signal indicating the likelihood of the candidate object being identical to the object to track.

The generated signal may be presented e.g. visually at a screen of an operator in the surveillance center. The operator can then use this information to further check visually in the two video sequences whether a match between a candidate object and an object to track really exists.

In an alternative embodiment of the invention, the first video surveillance camera and the second video surveillance camera may be the same video surveillance camera, in which case the first and the second video sequences are separate video sequences captured by the same camera.

The video surveillance camera or cameras and/or other nodes in the video surveillance system may have a computer arranged to receive a computer usable medium on which a computer program product is stored. The computer program product comprises computer readable program means for causing the computer to perform the steps of the method for identifying properties of an object in a video sequence and/or to perform the steps of the method for tracking an object in a video surveillance system according to the invention.

Theory

This chapter contains the basic theory behind the examined problem. The first section handles the equipment used in the investigation and the second section deals with the mathematics.

During the investigation, video sequences have been produced for research, training and validation purpose. The cameras used were an Axis 207 Network Camera and an Axis 210 Network Camera, both with automatic white balance and exposure control. These cameras use two different sensor technologies, a digital sensor CMOS in the former camera and an analogue sensor CCD in the later camera. With that the method described in this application was developed in a more general technological environment than a method adapted to a specific camera or sensor technology. The video sequences have been captured as MJPG files. Every MJPG file consists of series of JPG files. These are separated and converted into PPM files, which have been used as data in the investigation. Although, any kind of image format could have been used for practicing the invention.

The following sections describe the white balance and the color space issues in more depth and also deals with the mathematical aspect of these areas.

Most light sources around us are radiating black bodies. Their spectral intensities depend on their temperature and are given by Planck's law of black body radiation:

$$I(v, T) = \frac{2hv^3}{c^2} \frac{1}{e^{[(hv)/kT]} - 1}$$

where I is the spectral radiance, v is the frequency, T is the temperature, h is Planck's constant, c is the speed of light, e is the base of the natural logarithm and k is Boltzmann's constant.

Due to the black body radiation low temperature light sources shift toward the red (e.g. light bulbs) and high temperature light sources shift toward the blue (e.g. the sun).

The color of the light reflected from an object depends both on the color of the object and the color of the incident light. The human brain makes adjustments to compensate for the color of the surrounding light, therefore humans see the correct colors of objects irrespective of the incident light. A regular camera however does not make these adjustments and this effect the color in images (e.g. a white object can become bluish in an image if the incident light in the scene is blue). To create images that show the true colors of objects, a white balance algorithm has to be applied. The algorithm makes white objects in the scene white in the image and all other colors become correct too, with some accuracy.

Figure 6:
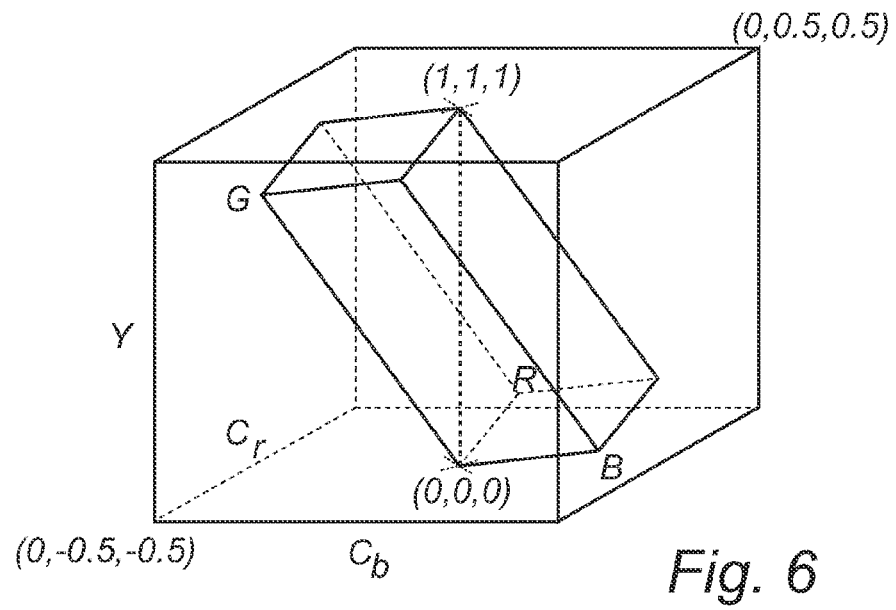
FIG. 6 illustrates the relationship between the RGB and YCbCr colorspaces.

Network cameras capture the images with sensors. These sensors use typically either the RGB or the CMYG color spaces. The human eye is less sensitive to color than to light intensity, therefore less resolution is needed in color than in intensity. Because of that it is better to work with color and intensity separated in image compression. Thus the images are converted to the YCbCr color space, where Y contains the intensity information and Cb and Cr contains the color information, before they are compressed into JPEG or MPEG format. This makes YCbCr the preferable color space for all image processing, since no further conversion is needed. FIG. 6 shows the YCbCr color space in relation to the RGB color space.

The YCbCr color space is a linear map of the RGB color space defined by:

$$\begin{pmatrix} Y \\ Cb \\ Cr \end{pmatrix} = \begin{pmatrix} 0.299 & 0.587 & 0.114 \\ -0.169 & -0.331 & 0.500 \\ 0.500 & -0.419 & -0.0813 \end{pmatrix} \begin{pmatrix} R \\ G \\ B \end{pmatrix}$$

where $0 \leq R, G, B \leq 256$, $0 \leq Y \leq 256$ and $-128 \leq Cb, Cr \leq 128$.

Method

Figure 7A:
FIG. 7a shows an image of a video sequence in which an object has been captured.
Figure 7B:
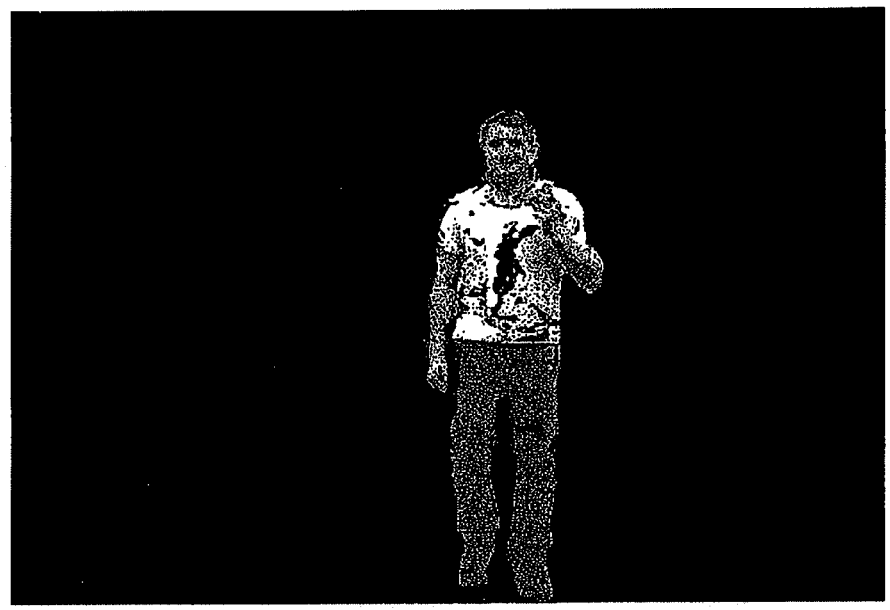
FIG. 7b shows the image of FIG. 7a in which the object has been segmented.

First, the images captured by a video surveillance camera are preprocessed to segment an identified object correctly. In FIG. 7a, an image comprising an identified object, being a person in an indoor environment is shown. In FIG. 7b the object has been segmented, i.e. the part of the image not corresponding to the object has been deleted. The segmentation could be performed by any known segmentation method separating the object from the rest of the scene.

One of the most promising features for identifying properties of an object and for tracking an object between two different video sequences based on identified properties of an object to track and identified properties of a candidate object has proven to be color. Using color histogram of humans as feature ought to be insensitive to variations such as change in shape, smaller partial occlusions, change in orientation and a shift in viewing position. On the other hand color histogram features are sensitive to changes in the color and intensity of the illumination. Therefore it might be better to use a color space in which intensity information and color information can be separated, such as the YCbCr color space, rather than RGB as color space since the effects of varying intensity and varying color of the illumination are separated in the YCbCr color space. Approximately, the illumination intensity varies along the Y-axis and illumination color varies in the CbCr plane. With that knowledge, variations in the illumination can be adjusted for. The YCbCr color space is also more suited to work with in hardware applications, as mentioned before.

Figure 8:
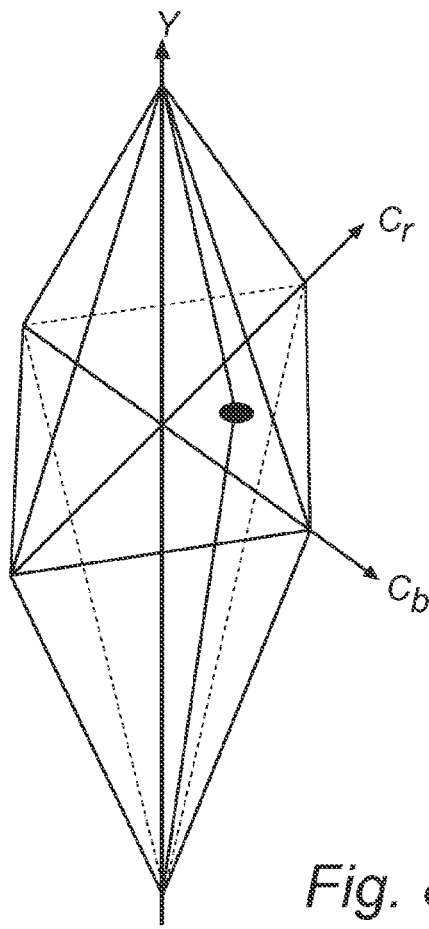
FIG. 8 shows the impact of varying illumination to a colored object illustrated in the YCbCr colorspace.

Working with three-dimensional color spaces are both consuming a lot of computer capacity and is hard to visualize for analysis purposes. Two-dimensional data (in CbCr, YCb and YCr plane) would be more convenient. In FIG. 8 it is seen that the YCbCr color space is not cubic. A one color object in different illumination intensities will therefore not stretch out parallel to the Y-axis but along lines seen in FIG. 8. It would be correct to project onto the CbCr plane along these lines but an approximation is made in this document in order to simplify. A projection of the YCbCr histograms straight onto all three planes has been used to create the two-dimensional histograms.

Figure 9A:
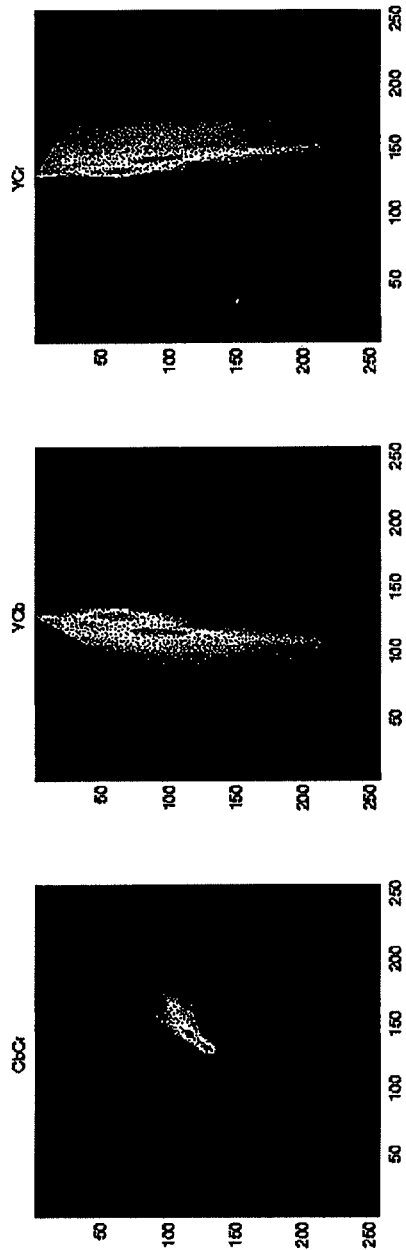
FIG. 9a shows CbCr, YCb and YCr color histograms of a person in a first scene.

For generating a histogram to be used for identifying properties of an object in a video sequence according to the invention, a plurality of images of the video sequence are needed. The more images from the video sequence that are used to generate a histogram, the more information are used, and the more robust becomes the method. The histograms are preferably divided by the number of pixels the object consists of in all images used, to make the method invariant to different time the object been viewed and to scale. When working with color histograms as features the method becomes invariant to spatial changes in the images, since the position of the persons different parts are not used. If a person for example holds a jacket in her hand or wears it does not matter in the color histogram. These features of a person in a first scene are seen in FIG. 9a as a CbCr, YCb and YCr histogram of the person presented in this order from left to right. The first variable in each pair is presented on the vertical axis and the second variable in each pair is presented on the horizontal axis. An offset of 128 is added to the Cb and Cr scale.

Figure 9B:
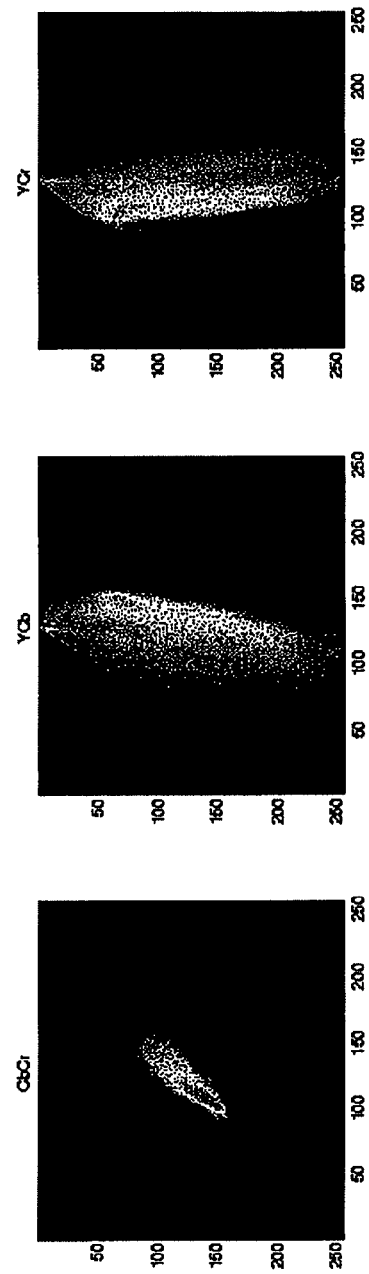
FIG. 9b shows CbCr, YCb and YCr color histograms of the person of FIG. 9a in a second scene.

The features of the same person in another scene are showed in FIG. 9b as a CbCr, YCb and YCr histogram of the person. The illumination color in these two scenes differed a lot. In one of the scenes the illumination consisted mainly of outdoor light, shifted to blue, and the object was illuminated by this light. But there where also an indoor light, shifted to red, present. This light illuminated the white object in the scene and therefore the camera white balanced on this illumination, leading to incorrect colors of the object. Because of this the histograms in FIG. 9a and FIG. 9b are not very similar. Recognizing the person by using this data is a hard problem to handle, therefore, it would be beneficial if the camera's white balance works for achieving a good result. This is guaranteed by using one type of light source. The final method of this document is validated using one type of light source. Although, tests have indicated that good results can be achieved also with different type of light sources.

Figure 10A:
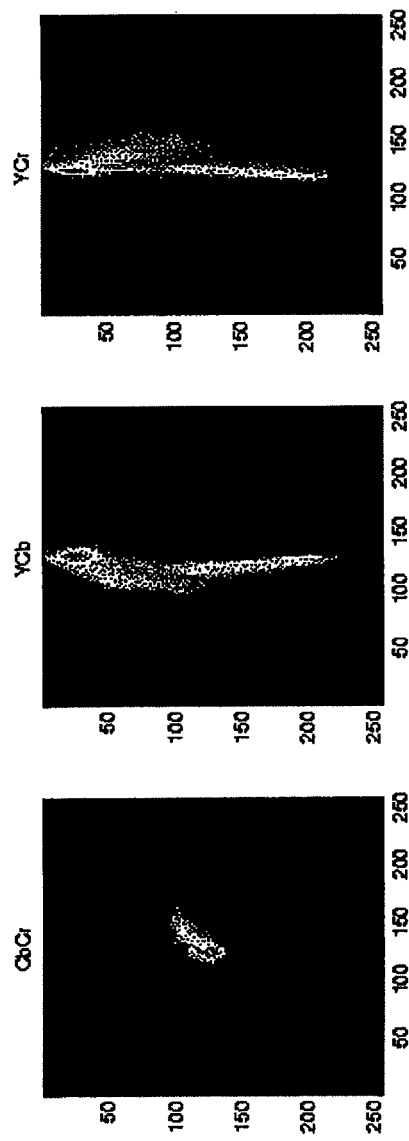
FIG. 10a shows CbCr, YCb, and YCr color histograms of another person in a first scene.
Figure 10B:
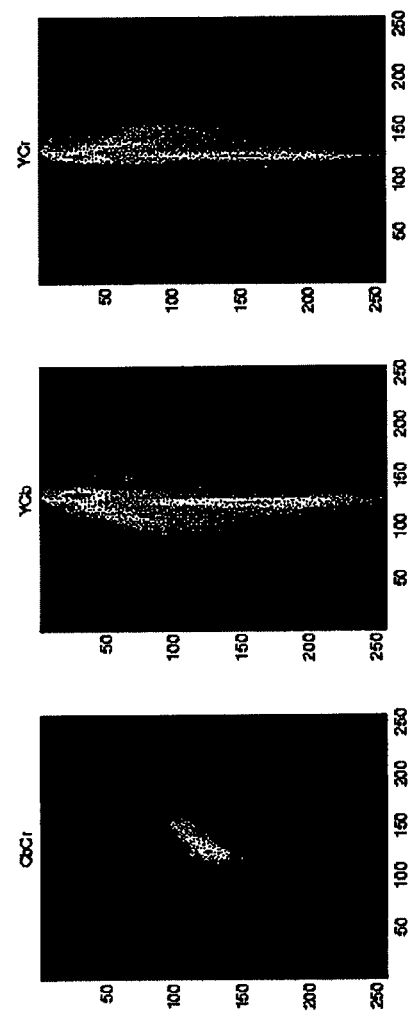
FIG. 10b shows CbCr, YCb and YCr color histograms of the person of FIG. 10a in a second scene.

In FIGS. 10a and 10b, CbCr, YCb, and YCr color histograms of a person in two different scenes can be seen, in which one type of light source has been used. In FIGS. 10a and 10b, the CbCr, YCb and YCr histograms of a person is presented in this order from left to right. The first variable in each pair is presented on the vertical axis and the second variable in each pair is presented on the horizontal axis. An offset of 128 is added to the Cb and Cr scale. The similarities between the color histograms in FIGS. 10a and 10b are much greater than between the scenes in FIGS. 9a and 9b. Analysis of several people's histograms (from two different scenes) showed that the CbCr plane were not as useful for recognition as the YCb and YCr plane when the objects to recognize are humans, as long as people tend to wear clothes with moderate colors. Because of that the data in the CbCr plane is often centered close to origin and the blobs representing different color objects (pieces of clothing) overlap. Therefore, the YCb and YCr histograms are preferably used as features for recognizing persons dressed in clothes of moderate colors.

Matching Features

To be able to recognize a person in different video sequences, the features from the different video sequences are matched against each other. Several methods have been presented in the literature to match histograms. Such methods could be used directly. One such method for matching histograms is to compare the bins in the histograms directly. A way to do this is to use the Bhattacharyya coefficient, which is the sum of the square roots of the product of the corresponding bins of the two histograms. This method is described in D. Comaniciu, V. Ramesh, and P. Meer, "*Kernel-based object tracking*", IEEE Computer Vision and Pattern Recognition, (2000).

Conic matching is an alternative matching method used to match blob features (e.g. in view matching). The conic matching algorithm segments pixels with similar color into blobs with shapes similar to ellipses. The blobs found in an image are then compared with blobs in other images to see if they match. The features used within this comparison are the blob's color, shape and position. This matching method is described in P. E. Forssén and A. Moe, "*View matching with blob features*", tech. rep., Department of Electrical Engineering, Linköping University.

Another matching method that could be used in the invention would be to model the histograms with normal distributions and then use the parameters of the models as matching features. This would reduce the amount of data significantly.

A distribution fitting algorithm, such as the Expectation Maximization (EM) algorithm models an unknown distribution by a set of normal distributions. The EM algorithm starts with a given number of normal distributions (classes) and initial parameter estimates of these classes. Two steps are then iterated until a stopping criterion is fulfilled. The steps are an expectation step with the current parameters (the E step) and then a maximization step to find new parameters (the M step). The EM algorithm does not have to converge to get a useful result, but the model gets better for every iteration. This is useful in this thesis since a fast method, which can be applied in real time, is needed. The EM algorithm is described in more detail below and in "*Image Modeling and Estimation, a Statistical Approach*", Lund University, 2005, ch. 2.3.3 The EM-algorithm for unknown distributions.

Due to the black background in the segmented images of the objects, a spike in $Y=0$ and $Cb,Cr=0$ is present in all the histograms of the test persons. These spikes disturb the EM algorithm and they contain no information about the object and are therefore removed. All the histograms also have an underlying distribution in addition to the blobs. A rectangle distribution is therefore added to the model. Because of this an adjustment of the EM algorithm has been done. The algorithm has also been adjusted to handle histograms.

The relative frequency of the rectangle distribution as well as the optimal number of classes can be decided manually or be calculated by any kind of known automatic method when modeling a distribution. Modelled histograms using different number of classes, i.e. different number of normal distributions, can be seen in FIGS. 11a-c. Each of these figures consists of two images; a histogram is shown in the left image and the histogram modeled with normal distributions is shown in the right image in αρ coordinates, which will be presented further down in the document. The variable α is presented on the vertical axis. In FIG. 11a K=2, where K is the number of normal distributions used in the modelled histogram, in FIG. 11b K=3 and in FIG. 11c K=4. The algorithm does also iterate towards a couple of different models, depending on the initial parameter estimates, for every histogram. Most histograms have more than one, often two, possible normal distribution models. Which one of these models to use can be chosen manually or by any kind of automatic method.

To get initial parameter estimates, one iteration of the K-means algorithm is used. The K-means algorithm is described in J. B. Mac Queen, "*Some methods for classification and analysis of multivariate observations*", in the 5$^{th}$ Berkeley Symposium on Mathematical Statistics and Probability, 1967, pp. 281-297. The K-means algorithm randomly position one cluster center for every class in the histogram and the bins are then clustered to their nearest cluster center. Finally the initial parameters are calculated for the different clusters.

Below is the adjusted EM algorithm, for histograms with a rectangle distribution, described. In the algorithm, $h_j$ are the heights of the histogram's bins and the two-dimensional $\bar{z}_j$ are the coordinates corresponding to the bins (Y and Cb or Cr); $j=1, \ldots, H$ where H is the number of bins, that are not empty; $k=0, \ldots, K$, is the class number, where K is the number of normal distributions and $k=0$ stands for the rectangle distribution; $\Theta_k = \{\bar{\mu}_k, \Sigma_k\}$ are the distribution parameters, where $\bar{\mu} = E(\bar{z})$ is the expectancy value and $\Sigma = E((\bar{z}-\bar{\mu})(\bar{z}-\bar{\mu})^T)$ is the covariance matrix of observations $\bar{z}$ of the distribution; $\pi_k$ stands for the relative frequencies and $\Psi_k = \{\pi_k, \Theta_k\}$.

One step of the K-means algorithm is run and all the bins become classified. The initial relative frequency estimates $\pi_k^0$ are given by $$\pi_k^0 = \frac{1-\pi_0}{K}$$

when assuming uniform initial relative frequencies and having the condition $$\sum_{k=1}^{K} \pi_k = 1 - \pi_0$$

for $k=1, \ldots, K$ and $\pi_0 = C$. C is a manually chosen constant.

The initial expectation values $\bar{\mu}_k^0$ are given by $$\bar{\mu}_k^0 = \frac{1}{\sum_{j \in k} h_j} \sum_{j \in k} h_j \bar{z}_j$$

for $k=1, \ldots, K$ representing the different classes. j∈k stands for the bins j which have been classified to class k.

Assuming that the distributions are uncorrelated in the different dimensions, in other words the initial covariance matrices $\Sigma_k^0$ have no covariance, and that the variances are the same for all classes we have $$\Sigma_k^0 = \Sigma$$

where $$\Sigma = \begin{bmatrix} \sum_{j=1}^{H} u_j^1 u_j^1 h_j & 0 \\ 0 & \sum_{j=1}^{H} u_j^2 u_j^2 h_j \end{bmatrix}$$

and $\bar{u}_{j \in k} = \bar{z}_{j \in k} - \bar{\mu}_k$, for $k=1, \ldots, K$. $\bar{u}_j$ is a two-dimensional variable $$\left( \bar{u}_j = \begin{bmatrix} u_j^1 \\ u_j^2 \end{bmatrix} \right)$$

where $u_j^1$ is the Y part and $u_j^2$ is the Cb or Cr part.

The EM algorithm estimates $\Psi = \{\pi, \Theta\}$ using data $z = \{\bar{z}_1, \ldots, \bar{z}_H\}$ with belonging bins $h = \{h_1, \ldots, h_H\}$. The variable $\bar{y} = (\bar{z}, \omega)$ is a version of $\bar{z}$ completed with model choice for each $\bar{z}$. Let $p(\bar{z}|\Psi)$ be the likelihood for the observed data, $\bar{z}$, and let $p(\bar{y}|\Psi)$ be the likelihood for $\bar{y}$.

$$p(\bar{y}|\Psi) = \Pi_{j=1}^{H} \pi_{\omega j} p(\bar{z}_j | \omega_j, \Theta_{\omega j})$$

Given the initial parameter estimates $\Psi^0$ the following steps are iterated.

The E-step: Evaluating $Q(\Psi, \Psi^{(t)}) = E(\log(p(\bar{y}|\Psi))|\bar{z}, h, \Psi^{(t)})$ $$Q(\Psi, \Psi^{(t)}) = \sum_{j=1}^{H} \sum_{k=1}^{K} h_j p_{j,k}^{(t)} (\log \pi_k + \log p(\bar{z}_j | w_j = k, \Theta_k))$$

where $$p_{j,k}^{(t)} = P(w_j = k | \bar{z}_j, h_j, \Psi^{(t)})$$

using Bayes's formula and getting $$p_{j,k}^{(t)} = \frac{\pi_k^{(t)} p(\bar{z}_j | w_j = k, \Theta_k^{(t)})}{\pi_0 p(\bar{z}_j | w_j = 0) + \sum_{k=1}^{K} \pi_k^{(t)} p(\bar{z}_j | w_j = k, \Theta_k^{(t)})}$$

for $k=1, \ldots, K$ and the special case for the rectangle distribution ($k=0$)

$$p_{j,0}^{(t)} = \frac{\pi_0 p(\bar{z}_j | w_j = 0)}{\pi_0 p(\bar{z}_j | w_j = 0) + \sum_{k=1}^{K} \pi_k^{(t)} p(\bar{z}_j | w_j = k, \Theta_k^{(t)})}$$

where in both two former equations $j=1, \ldots, H$ and t is the iteration number. $\omega_j = k$ means that bin number j has been classified as class number k.

Recall that we have normal distributions where $$p(\bar{z}_j | w_j = k, \Theta_k^{(t)}) = \frac{1}{\sqrt{(2\pi)^d |\Sigma_k|}} \exp\left(-\frac{1}{2}(\bar{z}_j - \bar{\mu}_k)^T \sum_k^{-1} (\bar{z}_j - \bar{\mu}_k)\right)$$

for k=1, ..., K and j=1, ..., H. d=2 is the number of dimensions (Y and Cb or Cr).

$p(\bar{z}_j|\omega_j=0)$ is approximately set to $1/256^2$. It should be 1/A where A is the area of the color plane. This approximation does not affect the result, but the expression loses its statistical meaning.

The M-step: Finding the $\Psi=\Psi^{(t+1)}$ which maximize Q($\Psi$, $\Psi^{(t)}$) under the condition $\pi_0+\Sigma_{k=1}^K \pi_k=1$ with Lagranges multiplication method for constrained optimization, giving $$\bar{\mu}_k^{(t+1)} = \frac{1}{\sum_{j=1}^H p_{j,k}^{(t)} h_j} \sum_{j=1}^H p_{j,k}^{(t)} \bar{z}_j h_j$$

for k=1, ..., K.

$$\sum_k^{(t+1)} = \frac{1}{\sum_{j=1}^H p_{j,k}^{(t)} h_j} \sum_{j=1}^H p_{j,k}^{(t)} h_j (\bar{z}_j - \bar{\mu}_k^{(t+1)})^T (\bar{z}_j - \bar{\mu}_k^{(t+1)})$$

for k=1, ..., K.

$$\pi_k^{(t+1)} = \frac{1-\pi_0}{n - \sum_{j=1}^H p_{j,0}^{(t)} h_j} \sum_{j=1}^H p_{j,k}^{(t)} h_j$$

for k=1, ..., K and where n is the number of pixels in the histogram.

A rectangle distribution may be used in the invention to model noise in the histogram such that the noise can be subtracted from interesting information in the histogram. When modeling the histograms, typically between two and five distributions are often suitable. However, less or more distributions may also be used. The number of distributions used when modeling the histogram may also be called classes, where class K=2 means that two distributions have been used. When adding a rectangle distribution to the models fewer classes were needed, but the models' similarity to the histograms decreased. This could be seen in FIG. 12, which shows a histogram in Ycb of a test person and corresponding normal distributions of the histogram with different relative frequencies ($\pi_0$) of the rectangle distribution. The histogram is presented in the upper left corner. The corresponding normal distribution models of the histogram with different relative frequencies ($\pi_0$) of the rectangle distribution can be seen with increasing $\pi_0$ from left to right and from top to bottom in the figure. Here $0 <= \pi_0 <= 0.35$. An offset of 128 is added to Cb.

The problem also becomes more complex, since another parameter (the relative size of the rectangle distribution) has to be adjusted, either manually or automatically. The rectangle distribution is therefore not used further in this document and its relative frequency is set to zero ($\pi_0=0$) in the algorithm above. Although, the rectangle distribution could be used as another embodiment of the invention.

Metric

This section deals with the development of a metric to measure the similarity between objects in different video sequences. The first part contains a discussion concerning which variables to use and in the second a metric function is developed.

The Metric Variables

The parameters ($\bar{\mu}_k$, $\Sigma_k$ and $\pi_k$ for classes k=1, ..., K) could be used to create a metric, but there are several reasons why it might be difficult to obtain a good result by comparing these parameters directly. Due to varying intensity and color of the light in the different scenes, the position of the blobs will change in the histogram. This makes the values of the normal distributions expectancy values ($\bar{\mu}_k$) hard to handle as a direct input to the metric function. The covariance matrices ($\Sigma_k$) and the relative frequencies ($\pi_k$) of the normal distributions are dependent both on the light in the scenes and how the distribution fitting algorithm builds the models of the histograms. They describe the dimensions of the normal distributions. Furthermore the blobs are not stretched out along the coordinate axes directions, but along the lines seen in FIG. 8. Since the variances and covariance are measured along the Y, Cb and Cr axes they change a lot if the blobs are rotated a little. The covariance matrices are therefore difficult to compare with each other. Accordingly both $\Sigma_k$ and $\pi_k$ are unstable features in recognition.

If a coordinate system with axes along the blobs extensions was used instead the covariance matrices would be easier to analyze and use as recognition features. Therefore, the coordinate system is changed from YCb or YCr to the coordinate system having coordinates p and a shown in FIG. 13 and defined by $$\alpha = \frac{180}{\pi} \arctan\left(-\frac{C}{Y}\right)$$

$$\rho = \sqrt{C^2 + Y^2}$$

where C stands for Cb or Cr and $\rho$ is given in degrees. In the new coordinate system, an intensity change in the illumination roughly leads to a position change of the blobs in the $\rho$ direction, and a change in the color of the light roughly leads to a position change of the blobs in the $\alpha$ direction. This knowledge can be used when comparing the models. The origin may advantageously be positioned in Y=256 and C=0 instead of Y=0 and C=0. Otherwise $\alpha$ does not describe the directions of the lines seen in FIG. 8. However, this only occurs if a very bright object is captured in a dark scene, which is unlikely when the objects are persons. Therefore, in most cases an approximation could be done and the origin could be placed in Y=0 and C=0.

FIG. 14 shows a histogram in YCb to the left in the figure and the same histogram in the new coordinate system with $\alpha$ and $\rho$ as coordinate axes to the right in the figure, where $\alpha$ is presented on the vertical axis and $\rho$ on the horizontal axis. An offset of 128 is added to Cb.

At least three types of changes might appear between different video sequences that influences the models:
  Translation of the whole cluster of blobs in the p and a direction.
  Rotation of the whole cluster of blobs.
  Internal translations of the blobs relative each other.

Variations related to scene and environment are then separated from variations related to the object. They could then be given different weights in a metric function, relative to their significance in recognition of the object.

To measure the translation of a whole cluster, the center of mass (or center of mass), ($\rho_{cw}$ and $\alpha_{cw}$) in the histograms are used, which is defined by $$\rho_{cw} = \frac{\sum_{j=1}^{H} h_j \rho_j}{\sum_{j=1}^{H} h_j}$$

$$\alpha_{cw} = \frac{\sum_{j=1}^{H} h_j \alpha_j}{\sum_{j=1}^{H} h_j}$$

where H is the number of bins in the histogram that are not empty and $h_j$ is the height of bin number j.

The center of mass might also be calculated directly in the YCr or YCb plane or YCbCr space.

To estimate the rotation of the cluster, a dominating direction, i.e. a central axis of the cluster is derived. One method to derive this central axis is the Principal Component Analysis (PCA) algorithm. However, several other algorithms exist for this purpose. PCA is described in "*Image Modeling and Estimation, a Statistical Approach*", Lund University, 2005, ch. 2.2.4 Data reduction. In an embodiment of the invention, the algorithm may take into account that every sample in the histogram has a weight. A Weighted PCA algorithm is an example of such an algorithm. Weighted PCA is described below.

In the algorithm, $h_j$ are the heights of the histogram's bins which are used as weights. The two-dimensional $Z_j$ are the two coordinates of the bins, $Z_j = (\rho_j, \alpha_j)$. j=1, ..., H where H is the number of bins that are not empty.

The principal components of the data $Z_j$, with belonging weights $h_j$, j=1, ..., H, are found through diagonalizing the covariance matrix $\Sigma$.

$$\sum = P \Lambda P^T$$

$$\sum = \frac{1}{\sum_{j=1}^{H} h_j} \begin{bmatrix} \sum_{j=1}^{H} h_j \rho_j \rho_j & \sum_{j=1}^{H} h_j \rho_j \alpha_j \\ \sum_{j=1}^{H} h_j \alpha_j \rho_j & \sum_{j=1}^{H} h_j \alpha_j \alpha_j \end{bmatrix}$$

where $\Sigma_{j=1}^{H} h_j$ is the number of pixels in the histogram. A is a diagonal matrix with eigenvalues $\lambda_1 \geq \lambda_2$ in decreasing order. P is an orthogonal matrix where column $\overline{P}_i$ is the eigenvector belonging to $\lambda_i$. The first principal direction, which is used as reference direction, is the eigenvector in P corresponding to the largest eigenvalue. Ensuring an unambiguous result the signs of $\overline{P}_1$ and $\overline{P}_2$ are changed, if needed, to make $\overline{P}_1$ point in the negative p-direction and $\overline{P}_2$ point in the positive a-direction.

To measure the internal movements of the blobs relative each other a new internal cluster coordinate system is used. The coordinate system is shown in FIG. 15. The reference direction is converted to a reference angle $\phi$, which increases counter-clockwise starting at the positive $\alpha$-direction. Origin is positioned in the center of mass (cw) of the cluster and the axes used are the two principal directions ($\overline{P}_1$ and $\overline{P}_2$) achieved from the algorithm above, i.e. the internal cluster coordinate axes. The transformation to the new coordinates is defined by $$[p1\ p2] = [\alpha - \alpha_{cw}\ \rho - \rho_{cw}] \cdot P$$

where p1 and p2 are the new coordinates, $\alpha$ and $\rho$ are the old coordinates, $\alpha_{cw}$ and $\rho_{cw}$ are the $\alpha$ and $\rho$ coordinates for the center of mass of the cluster. P is a two-by-two matrix with the first and second principal direction as columns respectively. Since the determinant of P is one, no change in scale has to be taken into account due to this transformation.

The variables finally used in the metric function are the center of mass ($\rho_{cw}$ and $\alpha_{cw}$) of the whole cluster, the reference angle ($\phi$) of the whole cluster, the relative frequencies ($\pi_k$) of the different classes and the position of the normal distributions (p1$_k$ and p2$_k$) in the internal cluster coordinate system where again k=1, ..., K is the class number and K is the total number of classes in the current model.

The Metric Function

Since the variables in the metric function are not necessarily equally important in recognition, their influence on the resulting degree of similarity between the two compared objects might be weighted according their importance. The total function is therefore constructed as a sum of weighted sub functions. The sub functions are, according to an embodiment constructed as quadratic functions of the deviation between the variables in the two compared models. Quadratic sub functions are used, instead of linear ones, to punish big deviations proportionally more than small deviations. The sub functions goes from zero to one, where the maximal deviation yields zero and one correspond to no deviation at all, between the compared model values of the current variable. Weights belonging to the variables are finally added to the sub functions. The sub functions dealing with variables connected to the individual blobs, rather than the whole cluster, are also divided by the number of blobs in the model with the least number of blobs. This is done in a way making the total function stretch between zero and one, where the latter result is received if two identical models are compared.

In equation 1.1 below, the construction of a sub function $f(x_1, x_2)$ of a general variable x can be seen. $x_1$ is the variable's value in model 1 and $x_2$ is the variable's value in model 2, where model 1 is the model with the highest number of normal distributions ($K_1$ is the number of normal distributions in model 1) and model 2 is the model with the lowest number of normal distributions ($K_2$ is the number of normal distributions in model 2).

$$f(x_1, x_2) = W_x \cdot \left(1 - \frac{(\Delta x)^2}{((\Delta x^{max})^2)}\right) \quad (1.1)$$

where $0 \leq W_x \leq 1$ and $\Sigma_{x \in U} W_x = 1$, $U = \{\rho_{cw}, \alpha_{cw}, \pi, p1, p2\}$ is a set consisting of all variables used in the metric. $\Delta x = |x_1 - x_2|$ and $\Delta x^{max}$ is the maximal possible deviation for the current variable, $\Delta \rho_{cw}^{max} = 256$, $\Delta \alpha_{cw}^{max} = 90$, $\Delta \phi^{max} = 180$, $\Delta \pi^{max} = 1$, $\Delta p1^{max} = 271$, $\Delta p2^{max} = 271$.

When matching the blobs in two models with each other, the best fitting pair of blobs is matched first. Then the best fitting pair of the remaining blobs is matched and so on until all blobs in the model with the least number of blobs are matched to a blob in the other model. The function used to match blobs $h(k_1, k_2)$ is defined by $$h(k_1, k_2) = \sum_{x \in T} f(x_1, x_2) \tag{1.2}$$

where f is defined by equation 1.1 and T={π, p1, p2} is a set of all variables in the metric connected to the individual blobs, and not to the cluster of blobs. Observe that these variables have one value for every normal distribution of the model, i.e. $\pi_{k1}$, $p1_{k1}$, $p2_{k1}$ in model 1 and $\pi_{k2}$, $p1_{k2}$, $p2_{k2}$ in model 2, where $1 \leq k_1 \leq K_1$ and $1 \leq k_2 \leq K_2$. This function gives the similarity value between one pair of normal distributions in model 1 and model 2, but all possible matching combinations of classes in the two models should be tested, before the best matches can be determined. In the total metric function only the best matches are used.

If there are different number of blobs in the two compared models a penalty function $p(K_1, K_2, \pi_{k1})$ punishes this in the total metric function defined by $$F(K_1, K_2, \pi_{k1}, k_1, k_2, x_1, x_2) = \tag{1.3}$$
$$H(k_1, k_2) - p(K_1, K_2, \pi_{k1}) + \sum_{x \in R} f(x_1, x_2)$$

where $F \leq 1$. Without p the function stretches between zero and one. $f(x_1, x_2)$ is constructed as in equation 1.1. $R = \{\rho_{cw}, \alpha_{cw}, \phi\}$ is a set of all the variables connected to the whole cluster, and not to the individual blobs. $p(K_1, K_2, \pi_{k1})$ is defined by equation 1.2. below.

$$p(K_1, K_2, \pi_{k1}) = \frac{\Delta K^2}{10} \sum_{k_1 \in V} \frac{1}{K_1} \pi_{k_1} \tag{1.4}$$

where $K_1$ is the number of normal distributions in model 1 and $K_2$ the number of normal distributions in model 2, $K_1 \geq K_2$ and $\Delta K = K_1 - K_2$. $\pi_{k1}$ is the relative frequency for class $k_1$ in model 1, $1 \leq k_1 \leq K_1$. V is a set consisting of all blobs in model 1 that were not matched to any of the blobs in model 2. The construction of p is a result of practical tests and analysis concerning the likelihood of getting different number of blobs in two different sequences, despite the same person being viewed in them. If the number of blobs in the sequences only differ by a small amount, such as one and the rest of the blobs match good with each other, the metric function should still give a high similarity value, e.g. if the person wears a sweater with a big sign on the front which only is viewed in one of the scenes. However, if the number of blobs differ by more than one, the likelihood of having the same person in the two sequences is small. Because of that p is proportional to ΔK to the power of two. The probability of disappearing blobs between sequences, despite the same person being viewed, is higher for small blobs than for large ones. The same is true for persons consisting of many blobs compared with persons consisting of just a few blobs. p is therefore proportional to the relative frequencies of the unmatched blobs $\pi_{k1}$ and inverse proportional to the number of blobs in model 1 $K_1$. Finally the equation is divided by a variable Z=10 to get suitable values. $H(k_1, k_2)$ is defined by $$H(k_1, k_2) = \frac{1}{K_2} \sum_{(k_1, k_2) \in S} h(k_1, k_2) \tag{1.5}$$

where $h(k_1, k_2)$ is defined in equation 1.2 and S is a set of the best matches found between the blobs in the two models.

Equation 1.3 is the metric function used to measure the similarity between compared objects in the test and validation part of this document, and it was implemented in matlab.

Validation

This chapter deals with the training and testing of the proposed method for identifying properties of an object in a video sequence and the proposed method for tracking the object in a video surveillance system. The first section describes the training part, where the weights of the metric are determined. Tests and results are then presented in the second section.

Training

To determine the weights ($W = \{W_{\pi cw}, W_{\alpha cw}, W_\phi, W_x, W_{p1}, W_{p2},\}$) used in the metric function, a set of training data has been used. This set consists of six video sequences ($L_1$, $L_2$, $M_1$, $M_2$, $N_1$ and $N_2$) from two different scenes (1 and 2) with similar illumination conditions, three sequences from each scene. Each one of these video sequences has captured a test person walking back and forth in the current scene. Three test persons (L, M and N) have been used to produce two sequences each, one from each scene. The camera position and viewing angle were not the same in the two scenes and the distance to the object and the part of the object viewed varied within the sequences. An image from the video sequence $L_1$ can be viewed in FIG. 16a and an image from the video sequence $L_2$ can be viewed in FIG. 16b.

A histogram and a normal distribution model was created for each training sequence, by the proposed method. For the test sequences the following number of distributions were used in the models: $L_1$ with K=3, $L_2$ with K=3, $M_1$ with K=3, $M_2$ with K=3, $N_1$ with K=5 and $N_2$ with K=5, where K is the number of normal distributions used. In FIGS. 17a and 17b there are three diagrams showing in the order from left to right in each figure: histogram in YCb; histogram in ρ–α; model of histogram in ρ–α for $L_1$ and $L_2$. FIG. 17a shows the histograms and model for $L_1$ and FIG. 17b shows the histograms and models for $L_2$.

All six sequences were compared with each other in all possible combinations, using the proposed metric. The desired output of the metric function are high similarity values when comparing two sequences containing the same person, and low similarity values when comparing two sequences containing different persons. These results varies when the weights $\overline{W}$ vary, and as the optimal combination of weights, the one maximizing the difference between the lowest similarity value between sequences containing the same person and the highest similarity value between sequences containing different persons has been chosen. To find the optimal weights simple for-loops were used in e.g. Matlab to loop through all possible combinations of $\overline{W}$. Increments of 0.04 were used under the constraining conditions $0 \leq W_{x \in U} \leq 1$ and $\Sigma_{x \in U} W_x = 1$, where $U = \{\rho_{cw}, \alpha_{cw}, \phi, \pi, p1, p2\}$. The optimal weight $W_{opt}$ was later used in the testing part of this thesis. Since working with two-dimensional data this optimization had to be done once in the YCb plane and once in the YCr plane, resulting in $W_{opt}^{Cb}$ and $W_{opt}^{Cr}$, which can be seen below $$\overline{W}_{opt}^{Cb} = [\ 0.16 \quad 0.80 \quad 0.00 \quad 0.00 \quad 0.04 \quad 0.00\ ]$$

$$\overline{W}_{opt}^{Cr} = [\ 0.04 \quad 0.84 \quad 0.04 \quad 0.00 \quad 0.08 \quad 0.00\ ]$$

where $\overline{W}_{opt}^{C} = [W_{opt,\pi}^{C}\ W_{opt,p1}^{C}\ W_{opt,p2}^{C}\ W_{opt,\phi}^{C}\ W_{opt,\alpha cw}^{C}\ W_{opt,\rho cw}^{C}]$ and C is Cb or Cr.

The similarity matrices $S^{Cb}$ and $S^{Cr}$, showing the similarity values for all possible combinations of the training persons L, M and N compared in scene 1 and 2, are presented in the following way $$S^C = \begin{bmatrix} L_1L_1 & L_1L_2 & L_1M_1 & L_1M_2 & L_1N_1 & L_1N_2 \\ L_2L_1 & L_2L_2 & L_2M_1 & L_2M_2 & L_2N_1 & L_2N_2 \\ M_1L_1 & M_1L_2 & M_1M_1 & M_1M_2 & M_1N_1 & M_1N_2 \\ M_2L_1 & M_2L_2 & M_2M_1 & M_2M_2 & M_2N_1 & M_2N_2 \\ N_1L_1 & N_1L_2 & N_1M_1 & N_1M_2 & N_1N_1 & N_1N_2 \\ N_2L_1 & N_2L_2 & N_2M_1 & N_2M_2 & N_2N_1 & N_2N_2 \end{bmatrix}$$

where C is Cb or Cr.
Using $[\overline{W}]_{opt}^{Cb}$ and $[\overline{W}]_{opt}^{Cr}$ yields $$S^{Cb} = \begin{bmatrix} 1.0000 & 0.9992 & 0.9746 & 0.9759 & 0.9782 & 0.9745 \\ 0.9992 & 1.0000 & 0.9777 & 0.9789 & 0.9792 & 0.9756 \\ 0.9746 & 0.9777 & 1.0000 & 0.9995 & 0.9696 & 0.9597 \\ 0.9759 & 0.9789 & 0.9995 & 1.0000 & 0.9709 & 0.9685 \\ 0.9782 & 0.9792 & 0.9696 & 0.9709 & 1.0000 & 1.9990 \\ 0.9745 & 0.9756 & 0.9597 & 0.9685 & 0.9990 & 1.0000 \end{bmatrix}$$

$$S^{Cr} = \begin{bmatrix} 1.0000 & 0.9997 & 0.9805 & 0.9730 & 0.9548 & 0.9582 \\ 0.9997 & 1.0000 & 0.9798 & 0.9721 & 0.9548 & 0.9582 \\ 0.9805 & 0.9798 & 1.0000 & 0.9999 & 0.9766 & 0.9799 \\ 0.9730 & 0.9721 & 0.9999 & 1.0000 & 0.9769 & 0.9800 \\ 0.9548 & 0.9548 & 0.9766 & 0.9769 & 1.0000 & 0.9996 \\ 0.9582 & 0.9582 & 0.9799 & 0.9800 & 0.9996 & 1.0000 \end{bmatrix}$$

The lowest similarity value between the same person in Cb is 0.9990 and the highest value between different persons in Cb is 0.9792, giving a difference of 0.0198. The same values for Cr is 0.9996 and 0.9805 giving the a difference of 0.0191.

Testing

To test the proposed recognition method a similar procedure to the training procedure is performed. A test set of eight video sequences ($E_1$, $E_2$, $F_1$, $F_2$, $G_1$, $G_2$, $H_1$ and $H_2$) were captured from the same two scenes (1 and 2) as in the training set. Four test persons (E, F, G and H) have been used to produce two sequences each, one from each scene. The conditions concerning the camera position, viewing angle, distance to the object and the part of the object viewed were the same as in the training sequences. An image from video sequences $E_1$ and $E_2$ is shown in FIGS. 18a-b.

As in the training procedure, a histogram and a normal distribution model of the histogram was created for each test sequence. In this training procedure, the following number of distributions were used in the models: $E_1$ with K=2; $E_2$ with K=2; $F_1$ with K=3; $F_2$ with K=3; $G_1$ with K=3; $G_2$ with K=3; $H_1$ with K=3; $H_2$ with K=3, where K is the number of normal distributions used. The histograms of the sequences and corresponding models for video sequences $E_1$ and $E_2$ are presented in FIGS. 19a-b; each figure consists of three images, which show from left to right: histogram in YCb; histogram in $\rho$-$\alpha$; model of histogram in $\rho$-$\alpha$.

All eight sequences were compared with each other in all possible combinations, using the similarity function and the weights from the training. The similarity values between test persons E, F, G and H compared in scene 1 and 2 are presented in two similarity matrices in the following way $$S^C = \begin{bmatrix} E_1E_1 & E_1E_2 & E_1F_1 & E_1F_2 & E_1G_1 & E_1G_2 & E_1H_1 & E_1H_2 \\ E_2E_1 & E_2E_2 & E_2F_1 & E_2F_2 & E_2G_1 & E_2G_2 & E_2H_1 & E_2H_2 \\ F_1E_1 & F_1E_2 & F_1F_1 & F_1F_2 & F_1G_1 & F_1G_2 & F_1H_1 & F_1H_2 \\ F_2E_1 & F_2E_2 & F_2F_1 & F_2F_2 & F_2G_1 & F_2G_2 & F_2H_1 & F_2H_2 \\ G_1E_1 & G_1E_2 & G_1F_1 & G_1F_2 & G_1G_1 & G_1G_2 & G_1H_1 & G_1H_2 \\ G_2E_1 & G_2E_2 & G_2F_1 & G_2F_2 & G_2G_1 & G_2G_2 & G_2H_1 & G_2H_2 \\ H_1E_1 & H_1E_2 & H_1F_1 & H_1F_2 & H_1G_1 & H_1G_2 & H_1H_1 & H_1H_2 \\ H_2E_1 & H_2E_2 & H_2F_1 & H_2F_2 & H_2G_1 & H_2G_2 & H_2H_1 & H_2H_2 \end{bmatrix}$$

where C is Cb or Cr yielding $$S^{Cb} =$$

$$\begin{bmatrix} 1.0000 & 0.9997 & 0.9908 & 0.9924 & 0.9931 & 0.9942 & 0.9820 & 0.9858 \\ 0.9997 & 1.0000 & 0.9877 & 0.9899 & 0.9928 & 0.9941 & 0.9813 & 0.9850 \\ 0.9908 & 0.9877 & 1.0000 & 0.9998 & 0.9859 & 0.9769 & 0.9928 & 0.9923 \\ 0.9924 & 0.9899 & 0.9998 & 1.0000 & 0.9874 & 0.9785 & 0.9939 & 0.9934 \\ 0.9931 & 0.9928 & 0.9859 & 0.9874 & 1.0000 & 0.9971 & 0.9543 & 0.9607 \\ 0.9942 & 0.9941 & 0.9769 & 0.9785 & 0.9971 & 1.0000 & 0.9925 & 0.9941 \\ 0.9820 & 0.9813 & 0.9928 & 0.9939 & 0.9543 & 0.9925 & 1.0000 & 0.9996 \\ 0.9858 & 0.9850 & 0.9923 & 0.9934 & 0.9607 & 0.9941 & 0.9996 & 1.0000 \end{bmatrix}$$

$$S^{Cr} =$$

$$\begin{bmatrix} 1.0000 & 0.9996 & 0.9909 & 0.9928 & 0.9926 & 0.9930 & 0.9977 & 0.9976 \\ 0.9996 & 1.0000 & 0.9936 & 0.9947 & 0.9938 & 0.9923 & 0.9983 & 0.9979 \\ 0.9909 & 0.9936 & 1.0000 & 0.9997 & 0.9887 & 0.9773 & 0.9885 & 0.9878 \\ 0.9928 & 0.9947 & 0.9997 & 1.0000 & 0.9901 & 0.9800 & 0.9895 & 0.9892 \\ 0.9926 & 0.9938 & 0.9887 & 0.9901 & 1.0000 & 0.9982 & 0.9969 & 0.9966 \\ 0.9930 & 0.9923 & 0.9773 & 0.9800 & 0.9982 & 1.0000 & 0.9985 & 0.9986 \\ 0.9977 & 0.9983 & 0.9885 & 0.9895 & 0.9969 & 0.9985 & 1.0000 & 0.9999 \\ 0.9976 & 0.9979 & 0.9878 & 0.9892 & 0.9966 & 0.9986 & 0.9999 & 1.0000 \end{bmatrix}$$

The lowest similarity value between the same person in Cb is 0.9971 and the highest value between different persons in Cb is 0.9942, giving a difference of 0.0029. The same values for Cr is 0.9982 and 0.9986 giving the a difference of −0.0004.

A simple way of using the information in Cb and Cr at the same time is to add $S^{Cb}$ and $S^{Cr}$ into a similarity matrix S getting $$S = \begin{bmatrix} 1.0000 & 0.9997 & 0.9909 & 0.9926 & 0.9929 & 0.9936 & 0.9898 & 0.9917 \\ 0.9997 & 1.0000 & 0.9907 & 0.9923 & 0.9933 & 0.9932 & 0.9898 & 0.9914 \\ 0.9909 & 0.9907 & 1.0000 & 0.9997 & 0.9873 & 0.9771 & 0.9906 & 0.9901 \\ 0.9926 & 0.9923 & 0.9997 & 1.0000 & 0.9888 & 0.9793 & 0.9917 & 0.9913 \\ 0.9929 & 0.9933 & 0.9873 & 0.9888 & 1.0000 & 0.9976 & 0.9756 & 0.9786 \\ 0.9936 & 0.9932 & 0.9771 & 0.9793 & 0.9976 & 1.0000 & 0.9955 & 0.9963 \\ 0.9898 & 0.9898 & 0.9906 & 0.9917 & 0.9756 & 0.9955 & 1.0000 & 0.9998 \\ 0.9917 & 0.9914 & 0.9901 & 0.9913 & 0.9786 & 0.9963 & 0.9998 & 1.0000 \end{bmatrix}$$

The lowest similarity value between the same person in this matrix is 0.9976 and the highest value between different persons is 0.9963, giving a difference of 0.0013.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A video surveillance system comprising:
a number of video surveillance cameras connected to a common communication network;
at least one identification apparatus connected to the common communication network, the at least one identification apparatus comprising:
an object identification unit arranged to identify a specific object plurality of images in a video sequence;
a processor arranged to preprocess said plurality of images in order to segment the specific object from the rest of the scene;
a color histogram generator arranged to generate a color histogram in at least two dimensions of a color space based on color and intensity information of the specific object originating from the segmented plurality of images of the video sequence; and
an object properties identificator arranged to identify properties of the specific object based on the generated color histogram;
a tracking device for tracking an object in a video surveillance system, the tracking device being connected to the common communication network, said device comprising:
a receiver for receiving information from the at least one identification apparatus, the information comprising information regarding identified properties of a candidate object identified in a first video sequence captured by a first video surveillance camera and information regarding identified properties of an object to track identified in a second video sequence captured by a second video surveillance camera;
a matching unit for matching the identified properties of the candidate object with the identified properties of the object to track; and
a calculation unit for calculating, based on the matching step, the likelihood of the candidate object being identical to the object to track.

2. Video surveillance system according to claim 1, wherein the first video surveillance camera and the second video surveillance camera are different video surveillance cameras in the video surveillance system.

3. Video surveillance system according to claim 1, wherein the first video surveillance camera and the second video surveillance camera is the same video surveillance camera in the video surveillance system.

4. Video surveillance system according to claim 1, wherein the tracking device further comprises:
a signal generator for generating a signal indicating the likelihood of the candidate object being identical to the object to track.

5. Video surveillance system according claim 1, wherein the information received from the at least one identification apparatus regarding the identified properties of the candidate object comprises parameters of the color histogram of the candidate object and the information received from the at least one identification apparatus regarding the identified properties of the object to track comprises parameters of the color histogram of the object to track, and wherein the matching unit is arranged for matching the parameters of the color histogram of the candidate object with the parameters of the color histogram of the object to track.

6. Video surveillance system according to claim 1, wherein the tracking device is situated at a central node of the system, connected to the number of video surveillance cameras via the common communication network.

* * * * *